Sept. 9, 1947.  F. B. BLAKE  2,426,981
AUTOMATIC TOLL TICKETING ALARM SYSTEM
Filed June 27, 1942  12 Sheets-Sheet 1

INVENTOR
F. B. BLAKE
BY
P. C. Smith
ATTORNEY

Sept. 9, 1947. F. B. BLAKE 2,426,981
AUTOMATIC TOLL TICKETING ALARM SYSTEM
Filed June 27, 1942 12 Sheets-Sheet 4

INVENTOR
F. B. BLAKE
BY
P. C. Smith
ATTORNEY

Sept. 9, 1947.　　　　　F. B. BLAKE　　　　2,426,981
AUTOMATIC TOLL TICKETING ALARM SYSTEM
Filed June 27, 1942　　12 Sheets-Sheet 5

INVENTOR
F. B. BLAKE
BY
P. C. Smith
ATTORNEY

INVENTOR
F. B. BLAKE
BY P. C. Smith
ATTORNEY

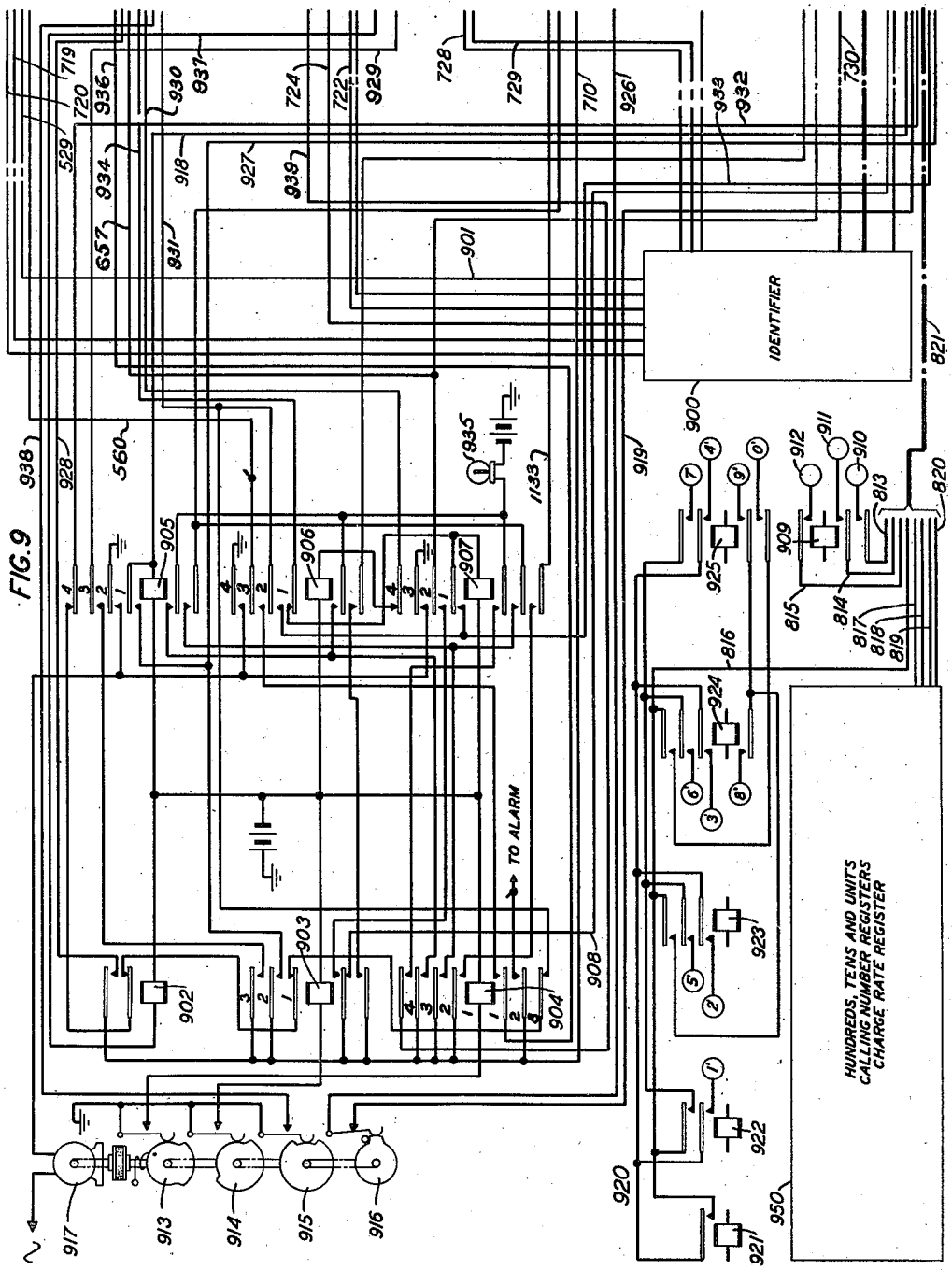

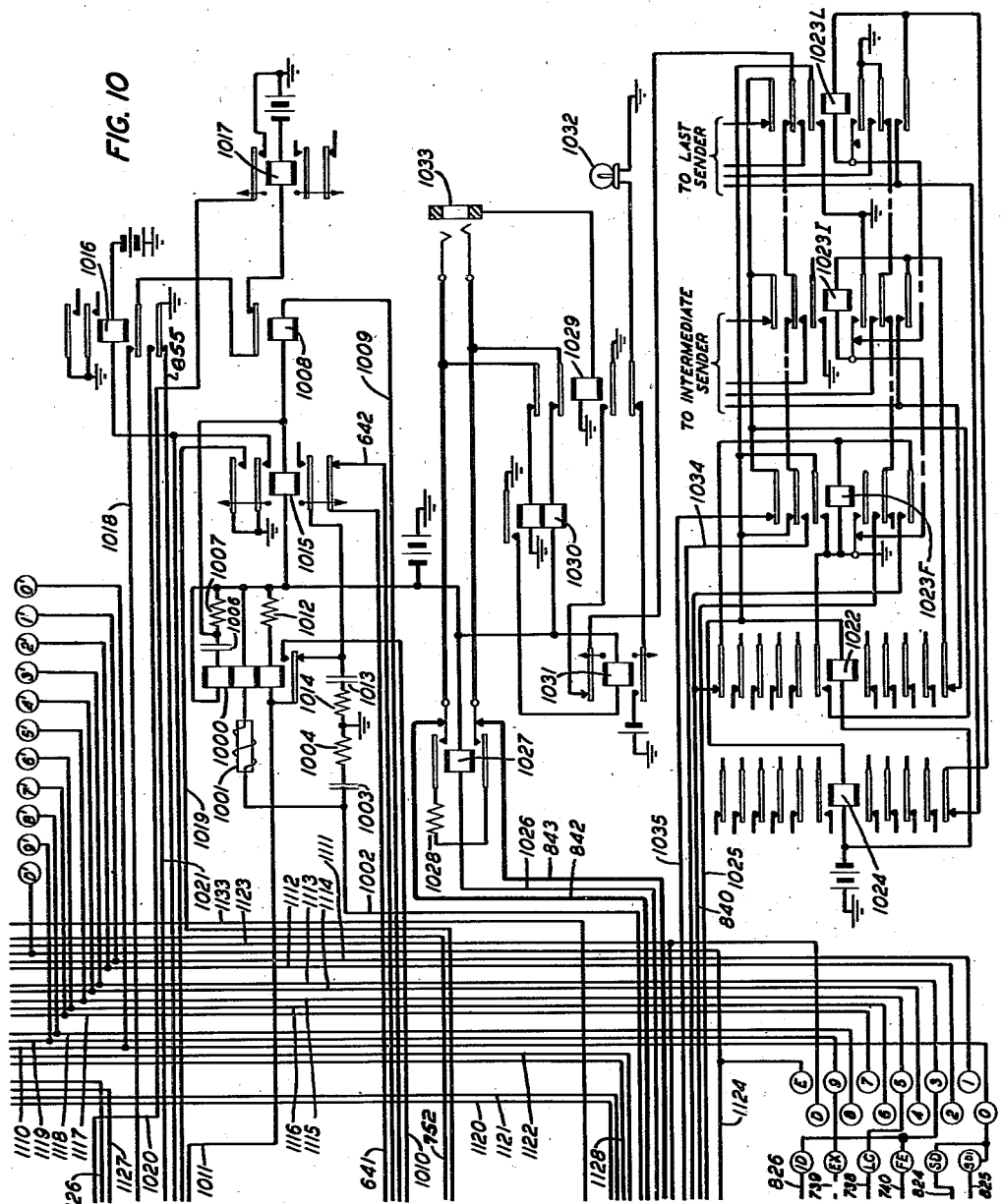

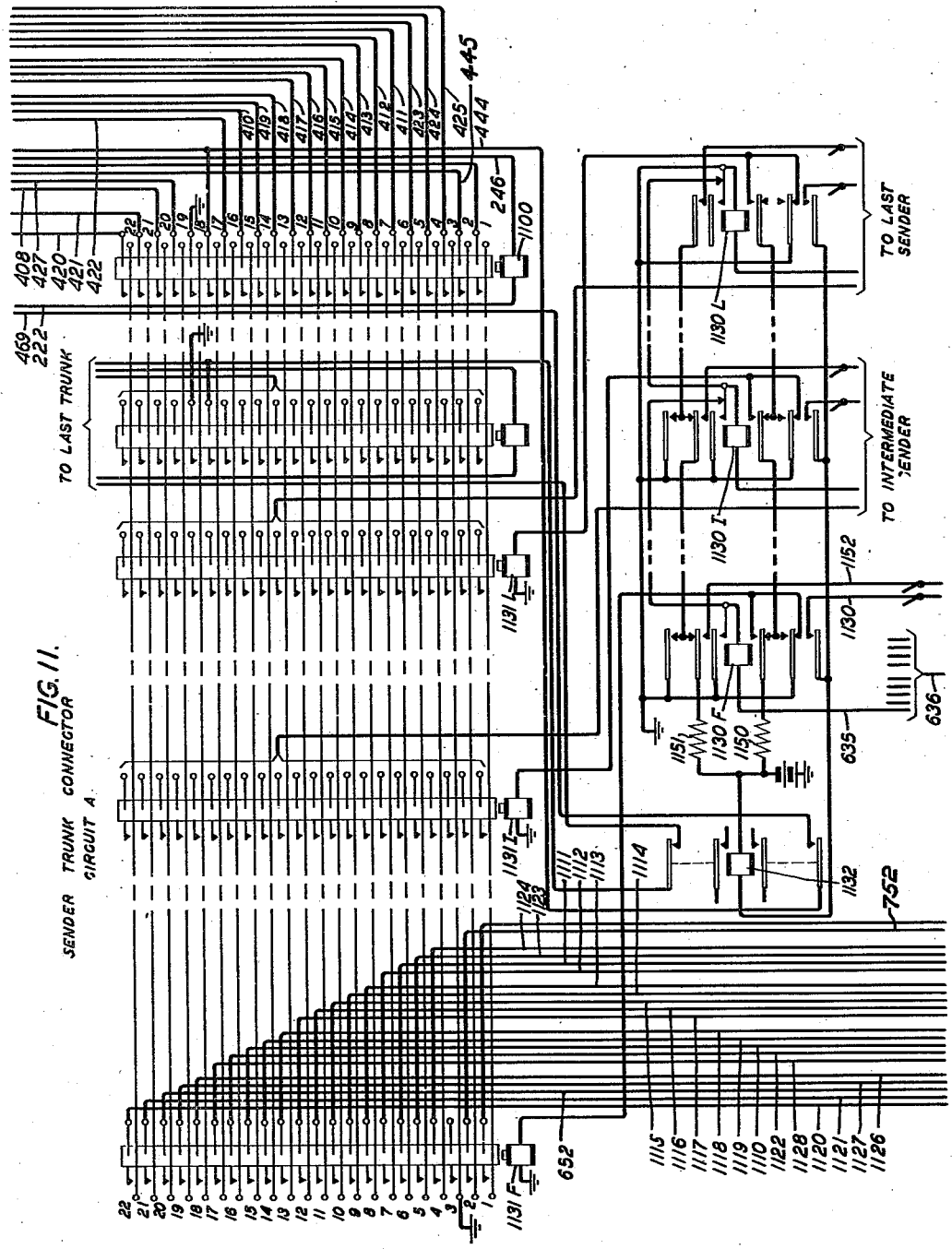

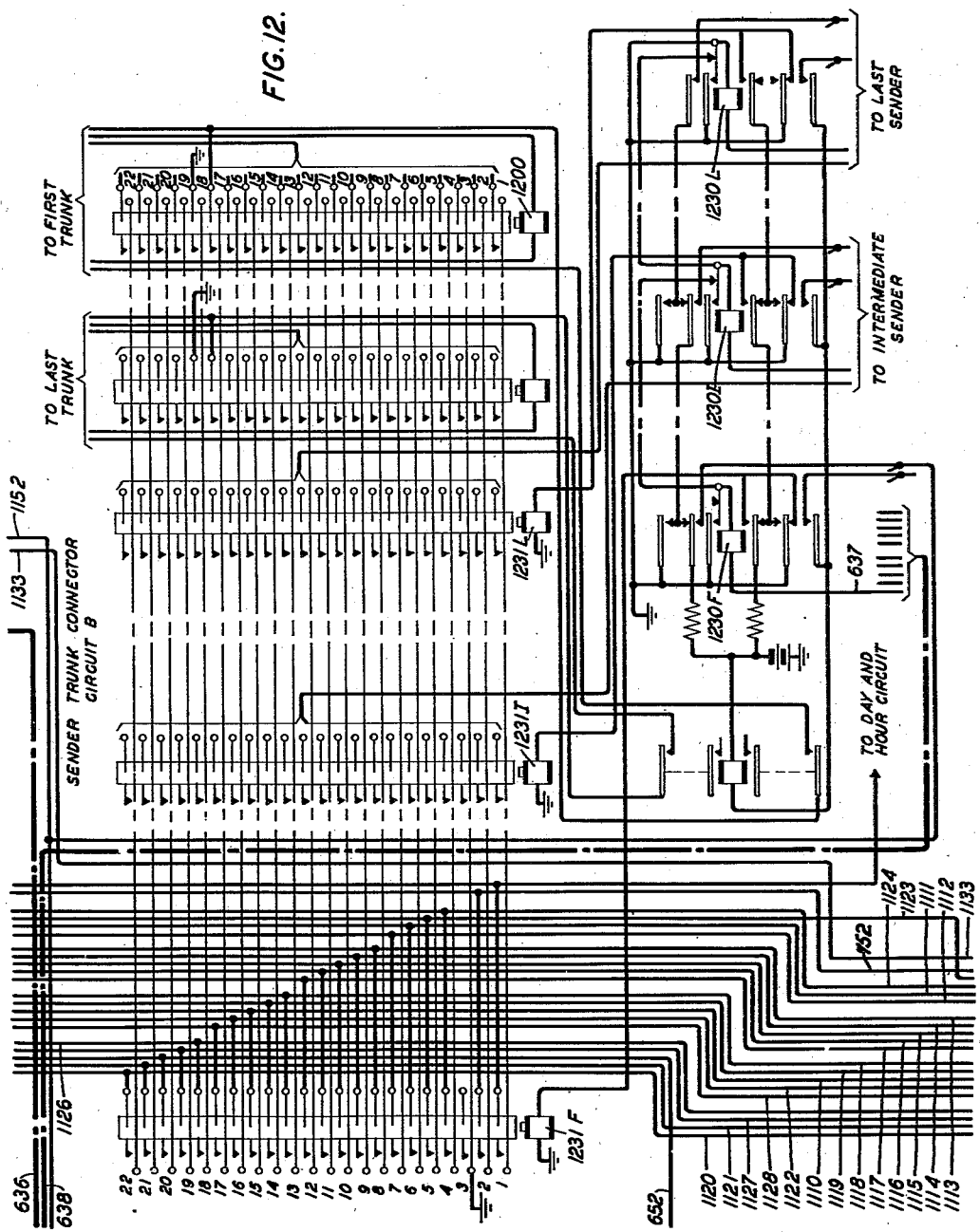

Patented Sept. 9, 1947

2,426,981

UNITED STATES PATENT OFFICE 2,426,981

AUTOMATIC TOLL TICKETING ALARM SYSTEM

Foster B. Blake, Mountain View, N. J., assignor to Bell Telephone Laboratories, Incorporated, New York, N. Y., a corporation of New York Application June 27, 1942, Serial No. 448,753

18 Claims. (Cl. 179—27)

This invention relates to a telephone system for enabling calling subscribers to control the establishment of toll connections by dialing and in which system a toll ticket having thereon all of the data required for billing a toll call is automatically printed. More particularly, the invention relates to improvements in a system of the general type disclosed in Patent No. 2,300,829 granted Nov. 3, 1942 to J. W. Gooderham.

In the system of the Gooderham patent, a group of tandem or automatic ticketing trunks is provided, each trunk having a ticket printer. A subscriber desiring a connection to a line terminating in an office in the nearby toll area dials the office code and numerical digits of the wanted line number and in response to the dialing of one or more of the office code digits a connection is extended to an idle one of the ticketing trunks which has access to the office in which the wanted line terminates. Immediately following the seizure of the trunk, an idle sender common to the ticketing trunks is associated with the seized trunk. The sender is provided with registers for registering the remaining digits of a called line number dialed by the calling subscriber and with registers for registering the digits of the calling line number.

Since, however, a digit dialed by a calling subscriber might be lost during the time elapsing from the seizure of the trunk and before the idle sender becomes associated with the trunk, the trunk is provided with a digit register for registering the digit dialed following the last code digit dialed to reach the trunk. Since the trunk may be seized by a first selector in response to the dialing of the first office code digit of certain called office designations, by a second selector in response to the dialing of the first two office code digits of other office designations, and by a third selector in response to the dialing of all three office code digits of still other office designations, the register in the trunk may register either the second or third office code digit or the thousands numerical digit. As soon as the first digit has been registered in the sender, which digit may be either the third office code digit, the thousands digit or the hundreds digit, an idle identifier is associated with the sender over an identifier-connector and the identifier is associated directly with the trunk over a trunk-identifier-connector. Thereupon the identifier reconstructs the office code dialed by the calling subscriber, which information may be derived from the trunk or from the trunk and sender, and transmits this information to the sender. The identifier also proceeds to identify the calling line and to transmit information concerning the designation digits of such calling line to the sender.

The sender after registering the office code digits of the wanted line number transmitted to it from the identifier and the numerical digits of the wanted line number dialed into the sender from the calling line, proceeds to direct the setting of selector switches to extend a connection from the ticketing trunk to the wanted subscriber's line. Such called office code and numerical registrations are also effective to control the printer of the trunk to print on the toll ticket, the office code and numerical digits which identify the called line. In addition, the registrations of the office code and numerical digits of the calling line transferred to the sender from the identifier are effective to control the printer to print such digits on the toll ticket. Provision is also made for printing other data required for ticketing the call such as the date and time the call was made and the elapsed time of conversation.

It is an object of the present invention to further improve an automatic ticketing system of the type above described, whereby a test may be made to determine whether a tip or ring substation on a party line has initiated a call for enabling the identifier to identify the directory number of the calling party line substation and whereby a check is made following the termination of conversation if a previous tip party identification was made to determine whether such identification resulted from a bona fide tip party call or from a false line ground condition and if made from a false ground condition to print a special notation on the ticket indicative of the fact that that ticket should not be used.

It is a further object of the invention to provide facilities whereby in the event the identification of the calling line fails, such line may be extended to a monitoring operator's position whereupon the operator may secure the calling line identification from the calling subscriber and whereby the ticket printer is controlled to print on the toll ticket a special notation in lieu of the calling line designation digits.

To attain the first of these objects the sender is provided with relay equipment which associates a test relay with the tip and ring conductors of the connection extending from the sender over the ticketing trunk and to the calling line and preliminarily prepares such test relay. If the test relay operates during a time interval due to the ground at the tip station of the line, a tip party is indicated as having initiated the call. If the relay does not operate, a ring party is indicated. This party station information secured by the sender is transferred to and registered in the identifier associated with the sender whereby the identifier is controlled to look for and identify a tip or a ring party substation. At the end of the conversation the same or another sender is seized and the party line test is repeated. The tip ground should not be present but if so the sender functions to control the ticket printer of the trunk to cause the sender number and a series of dashes to be printed on the ticket to indicate that a grounded line was encountered and that the ticket should be disregarded for billing purposes.

To attain the second of these objects the sender is provided with apparatus whereby if the associated identifier fails to complete the identification of the calling line, the calling line is extended through the sender to a trunk terminating at a monitoring operator's position. The monitoring operator upon answering the call on such trunk may then challenge the calling subscriber to secure his directory number and the number of the line with which he desires a connection. The toll ticket for the call is then printed in the usual manner except that a special notation is printed on the ticket in place of the calling line number which the identifier failed to secure, which notation informs the billing department that the toll ticket for the call should be supplemented by the information which the monitoring operator secured from the calling subscriber and recorded upon an auxiliary manually made toll ticket.

The invention having been described in a general manner, reference may now be had to the following detailed description thereof taken in connection with the accompanying drawing in which:

Fig. 1 shows a two-party line, the schematic representation of a line finder; first, second and third selector switches over which access may be had to an idle one of a plurality of automatic ticketing trunks, one of which is disclosed in Figs. 2, 3 and 4, and to the right of the dot-dash line, the schematic representation of a trunk-finder of a B group of trunk finders, individual to a sender for connecting such sender with a calling one of a B group of one hundred ticketing trunks;

Figs. 2, 3 and 4 taken together show a complete ticketing trunk including a digit register, duration of conversation registers and an automatic ticket printer;

Fig. 5 shows a trunk finder of the A group of finders individual to the same sender as the trunk finder of Fig. 1 for connecting the sender with a calling one of an A group of one hundred ticketing trunks;

Figs. 6 to 10, inclusive, show such portions of a sender as are deemed necessary for an understanding of the invention; Figs. 6, 7 and 8 showing control relays and Fig. 8 also showing a progress switch for successively associating groups of sender registers with the ticket printer of Fig. 4; Fig. 9 showing in the lower left portion one of the sender registers and a box representing other registers, a box representing an identifier and timing equipment of the sender, and Fig. 10 showing in the lower portion thereof the sender monitoring trunk and the relay equipment of the sender associated therewith and in the upper portion thereof, the dial pulse receiving circuit of the sender;

Fig. 11 shows a sender-trunk-connector of an A group for connecting any seized sender with the ticketing trunk of the A group of ticketing trunks which has seized such sender;

Fig. 12 shows a sender-trunk-connector of a B group for connecting any seized sender with the ticketing trunk of the B group of ticketing trunks which has seized such sender; and Fig. 13 is a chart showing how the several figures of the drawing should be arranged to fully disclose the invention.

Figure 1:
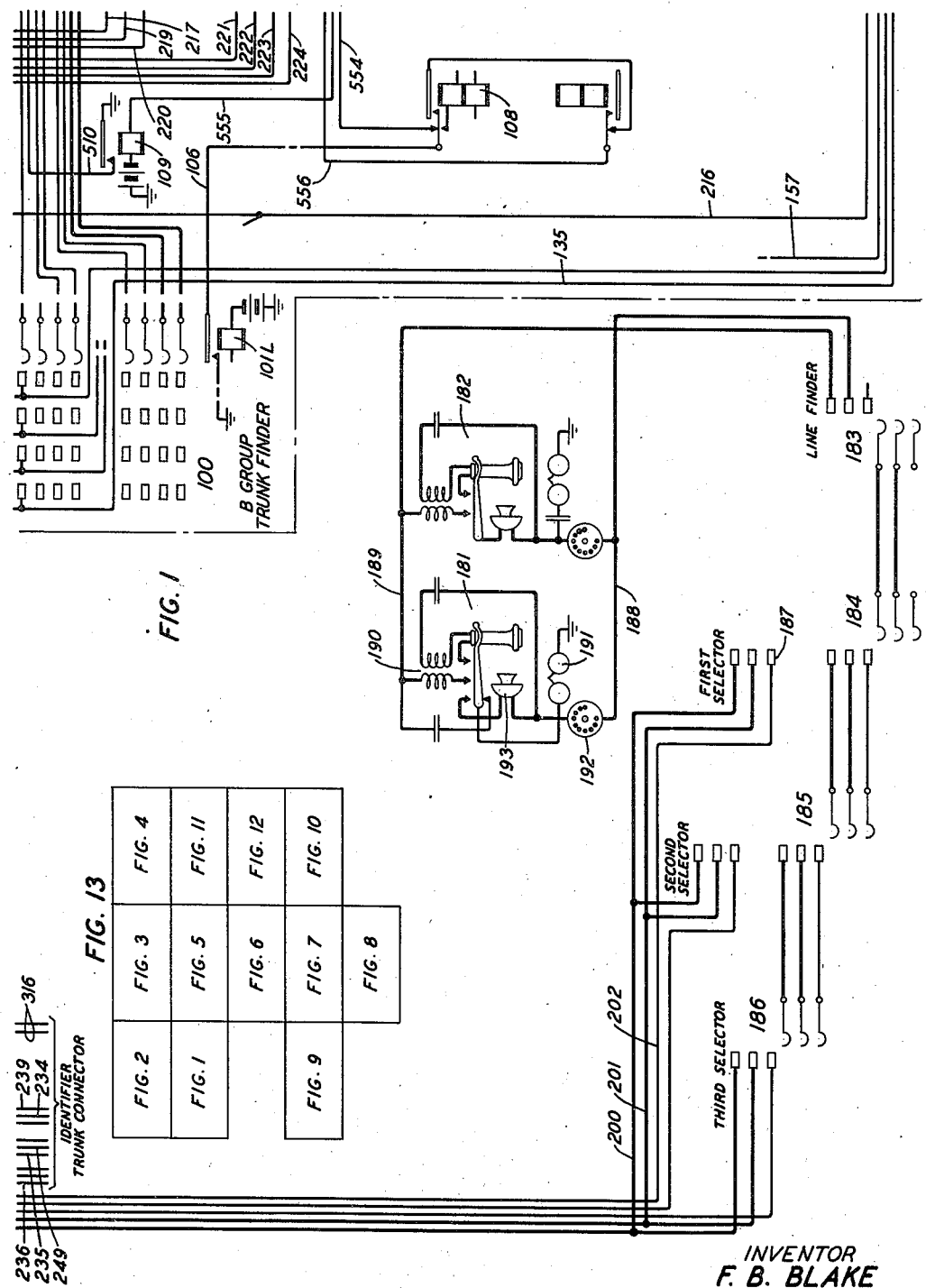
Figure 2:
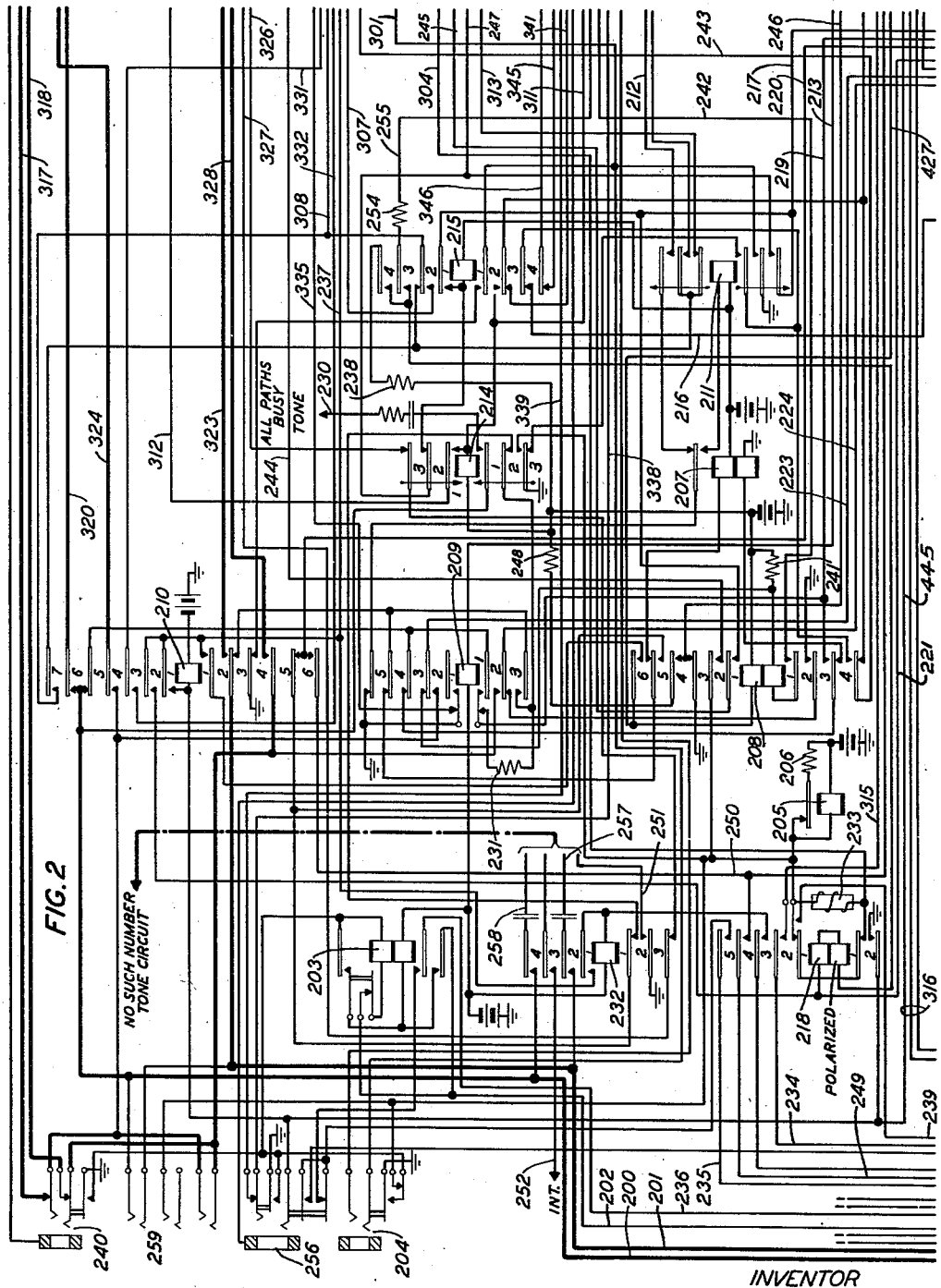
Figure 3:
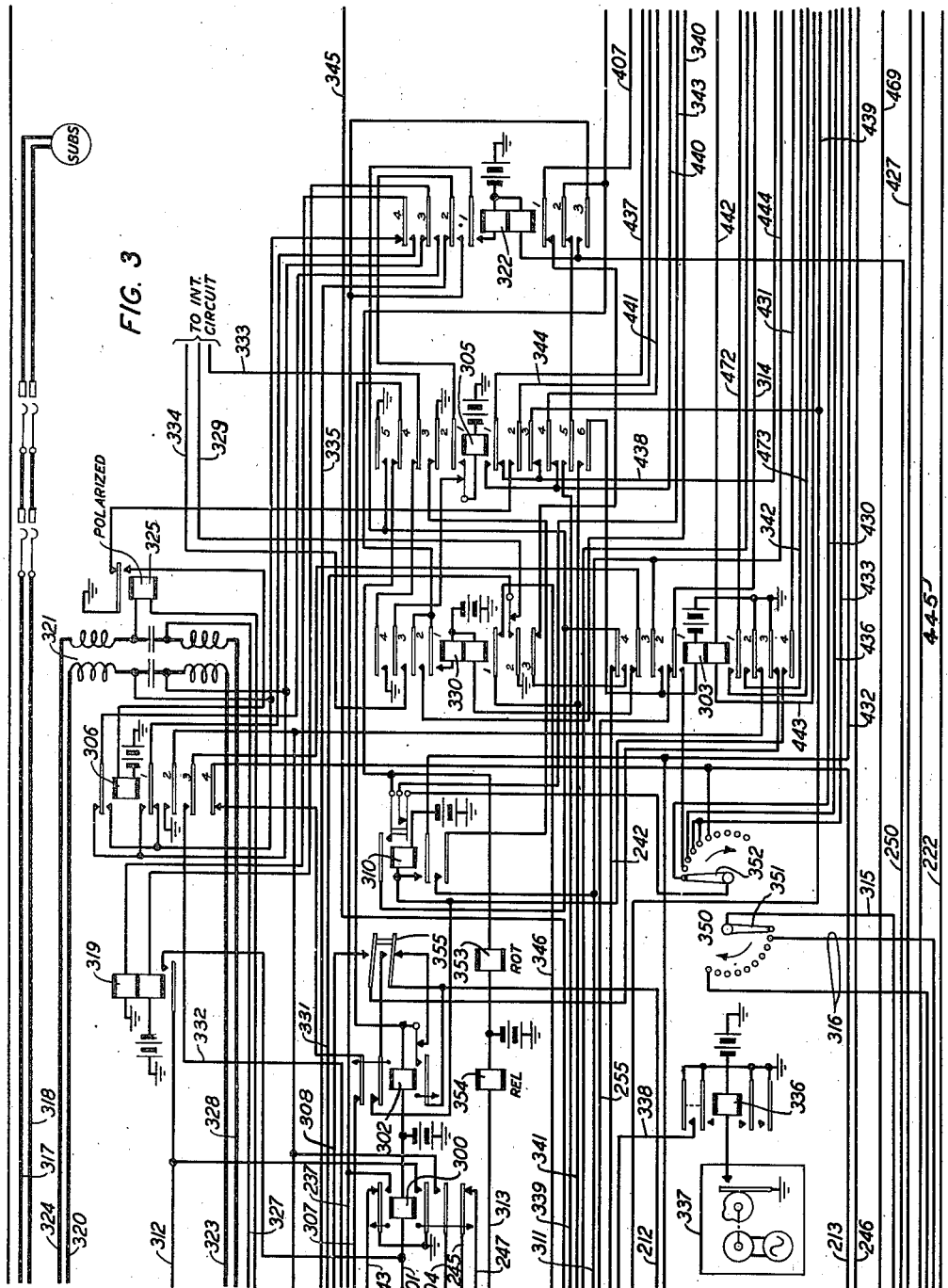
Figure 4:
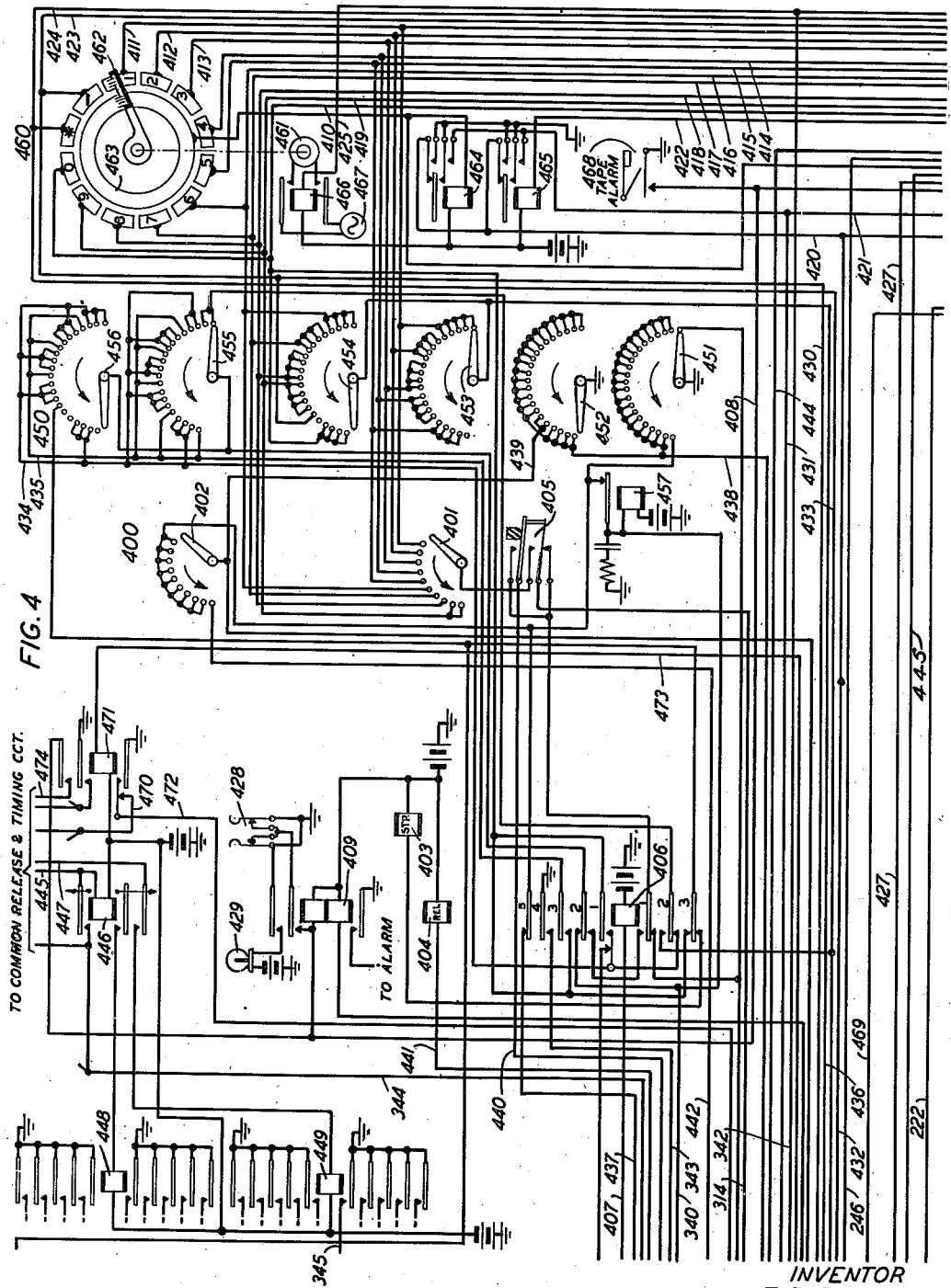

The line finder 183 and the selector switches 184, 185, and 186 of Fig. 1 are of the well-known step-by-step type and the selector switches are operative in response to the dial of a calling line to establish local connections or to establish a connection with an idle automatic ticketing trunk, such as is disclosed in Figs. 2, 3 and 4, should the subscriber desire a connection with a subscriber's line which terminates in the toll area adjacent to the exchange area in which the calling line terminates. As disclosed the ticketing trunk of Figs. 2, 3 and 4 has a branch which terminates in the bank of a first selector 184, another branch which terminates in the bank of a second selector 185, and still another branch which terminates in a bank of a third selector 186 whereby the trunk may be seized in response to the dialing of the first office code digit of a certain distant office, in response to the dialing of the first and second office code digits of another office and in response to the dialing of the three office code digits of still another office.

The elapsed time registers 400 and 450 and the digit register 350 associated with the ticketing trunk and the progress switch 850 of the sender are of the well-known rotary step-by-step type. The brushes 351 and 352 of the digit register are advanced step by step in response to the operation of the stepping magnet 353 and are restored by the operation of release magnet 354. The brushes 401 and 402 of register 400 are advanced step by step by stepping magnet 403 and are restored by release magnet 404 and the brushes of register 450 and progress switch 850 are advanced step by step from their normal positions and are returned to their normal positions by a further forward stepping movement.

The ticket printing mechanism 460 associated with the automatic ticketing trunk may be of the type disclosed in the Patent No. 2,309,688 granted Feb. 2, 1943, to W. J. Zenner.

Two trunk finders of the step-by-step double brush set type are individualized to each sender. One pair of such trunk-finders is disclosed in Fig. 5 and in the right portion of Fig. 1. One brush set of the A finder shown in full in Fig. 5, has access to an upper bank of terminals in which control conductors from a first one hundred ticketing trunks terminate and the other brush set has access to a lower bank of terminals in which other control conductors from the same one hundred trunks terminate. One brush set of the B finder shown schematically in the right portion of Fig. 1 has one brush set which has access to an upper bank of terminals in which control conductors from a second one hundred ticketing trunks terminate and a second brush set which has access to a lower bank of terminals in which other control conductors of the same one hundred trunks terminate.

Since a trunk-finder does not have sufficient brushes in both of its brush sets to accommodate all of the control conductors required between a trunk and a sender, a plurality of additional sender-trunk-connector circuits is provided, that shown in Fig. 11 having a multicontact relay individual relay to each sender and ten multicontact relays individual respectively to ten trunks. Ten of such circuits serve the A group of one hundred trunks. Fig. 12 shows one of the ten similar circuits which serve the B group of one hundred trunks.

As previously stated only so much of one of the senders is disclosed as is deemed necessary for a complete understanding of the invention, only one of the registers of the sender being partly disclosed in Fig. 9 and the circuits for controlling out-pulsing being omitted. The day and hour circuit and identifier have not been disclosed as they are concerned only incidentally with the present invention. For a full disclosure of the entire system to which the present invention is applicable, reference may be had to the application of J. W. Gooderham Serial No. 448,782, filed concurrently herewith.

To more clearly set forth the novel features of the invention, it will first be assumed that the tip party, whose substation is identified by the numeral 181 in Fig. 1, initiates a call for a toll connection to a subscriber's line terminating in an office of a toll area to which the calling subscriber is permitted access by dialing. Upon the removal of the receiver from the switchhook, an idle line finder having access to the calling line, such as the line finder 183, is started in search of the calling line in a well-known manner. When the line finder has found the calling line the usual dial tone is transmitted over the calling line to inform the subscriber that his line has been connected with a first selector 184, paired with the line finder 183, and that he may therefore commence dialing the digits of the wanted line number.

It will be assumed that the calling subscriber desires a connection with a line whose directory number is MAR—1345 and that a ticketing trunk over which the connection may be extended may be reached from the sixth level of the bank of first selector 184. The calling subscriber upon hearing the dial tone therefore proceeds to dial the office code letters M, A, R, and the numerical digits 1, 3, 4 and 5. In response to the dialing of the first office code letter M, which has a numerical equivalent 6, the first selector 184 is operated to elevate its brush set to a position opposite the sixth bank level and to then hunt over the terminals of this level in search of an idle ticketing trunk. It will be assumed that the trunk disclosed in Figs. 2, 3 and 4 is idle and that therefore when the test or sleeve brush of selector 184 engages the test or sleeve terminal 187 of the branch of this trunk, it finds no busy ground potential thereon and therefore the selector seizes the trunk. A circuit is thereupon effective from ground at the selector over the sleeve conductor 202 of the trunk, through the upper normal contacts and upper winding of sleeve relay 203, over the lower normal contacts of busy test jack 204, through the winding of relay 205 and in parallel therewith over the back contact of relay 205 and through resistance 206 to battery and ground. Relay 203 operates from the low resistance battery thus supplied, locks from battery through its lower winding and over its lower front contact to the sleeve conductor 202, opens the initial operating circuit through its upper winding, connects its lower winding over its upper and lower front contacts in parallel with the winding of relay 205, and prepares a circuit over its inner lower front contact for a purpose to be later described. Relay 205 also operates and removes resistance 206 from the parallel connection with its winding. As soon as the talking circuit is cut through at the selector 184, a circuit is established from ground through the lower winding of relay 207, over the lower No. 3 back contact of relay 208, the upper No. 3 back contact of relay 209, the upper No. 5 back contact of relay 210, tip trunk conductor 200, tip brushes of selector 184 and line finder 183, over the calling line loop through the substation 181, thence returning over the ring brushes of the line finder 183 and selector 184, ring trunk conductor 201, the lower No. 2 back contact of relay 210, the upper No. 4 back contact of relay 209, the upper No. 5 back contact of relay 208 to battery through the upper winding of relay 207. Relay 207 thereupon operates closing over its front contact a circuit for slow-to-release relay 211 which may be traced from ground over the upper No. 5 back contact of relay 209, over the front contact of relay 207, to battery through the winding of relay 211. Relay 211 thereupon operates, establishes a circuit for slow-to-release relay 300, extending from battery through its winding, over conductor 301 to ground over the middle lower contacts of relay 211; prepares over its upper contact a circuit for the stepping magnet 353 of the digit register 350, and for the slow-to-release relay 302; connects ground from the lower No. 3 back contact of relay 214, over its inner lower front contact, the lower No. 3 back contact of relay 215 to the trunk start conductor 216 which is common to the ten trunks of a subgroup and establishes a connection from ground and battery through the winding of relay 215, the upper No. 2 back contact of relay 214, the lower contact of relay 211, to conductor 217 to mark the trunk as calling so that the started trunk finder will stop on the terminals of such trunk. Relay 300, upon operating, connects ground over the lower No. 2 back contact of relay 303, the lower front contact of relay 300, conductor 304, over the inner No. 1 normal contacts of relay 218, the lower contacts of test jack 204, the upper contacts and through the lower winding of sleeve relay 203 to battery for holding the sleeve relay operated after ground is removed at the selector 184, and over the lower contacts of relay 203 to sleeve conductor 202 of the trunk to hold the selector 184 and the line finder 183 from releasing.

When relay 207 releases due to the opening of the dialing circuit for the first pulse of the second code letter A, the circuit for magnet 353 and the circuit of relay 302 previously prepared by the operation of relay 211, are completed from ground over the upper No. 5 contacts of relay 209, the back contact of relay 207, the upper contacts of relay 211, conductor 212, the lower normal contacts of off-normal switch 355 of the digit register 350, through the lower normal contacts and winding of relay 302 to battery and ground and in parallel over the upper No. 4 back contact of relay 305, through the winding of stepping magnet 353 to battery and ground. Magnet 353 and relay 302 both operate, relay 302 because of its slow-to-release characteristic remaining operated until the termination of the impulse series. Upon the first step advance of the register brushes 351 and 352, the off-normal switch 355 becomes operated, whereupon the operating circuits of relay 302 and magnet 353 are extended over the lower alternate contacts of relay 302, over the circuit traced to ground over the contacts of relay 209. Since the second code letter dialed was A, two impulses are transmitted in the impulse series and brushes 351 and 352 are advanced to the second terminal positions of their arcs. Upon the termination of this impulse series relay 302 releases.

In the meantime, however, the connection of ground to the trunk finder start conductor 216 has caused the operation of the group start relay 501L which is allocated to the last subgroup of ten trunks of the A group of one hundred trunks. Ten group relays are provided individual respectively to the ten subgroups of trunks of the A group, one of the group relays individual to an intermediate subgroup being shown at 501I and the group relay of the first group being shown at 501F. Ten similar group relays would be provided for the ten subgroups of the B group of one hundred additional trunks and associated with the B group of trunk finders, one of which is disclosed schematically in Fig. 1. Group relay 501L upon operating connects ground over its inner lower contact to the level segments 503 of the vertical commutators 502 of all trunk finders of the A group having access to the A group of trunks; connects ground to the trouble alarm circuit 504 and causes the operation of the start relay 509 of the first idle trunk finder. The trunk finders are divided into preference subgroups in accordance with the subgroups of trunks whereby any trunk of a subgroup has the preferential use of the trunk finders and associated senders of a particular subgroup. If at any time all the trunk finders which are first choice preference of a subgroup of trunks are busy such subgroup of trunks then has second choice use of the trunk finder of another subgroup which is normally the first choice of another subgroup of trunks.

Figure 5:
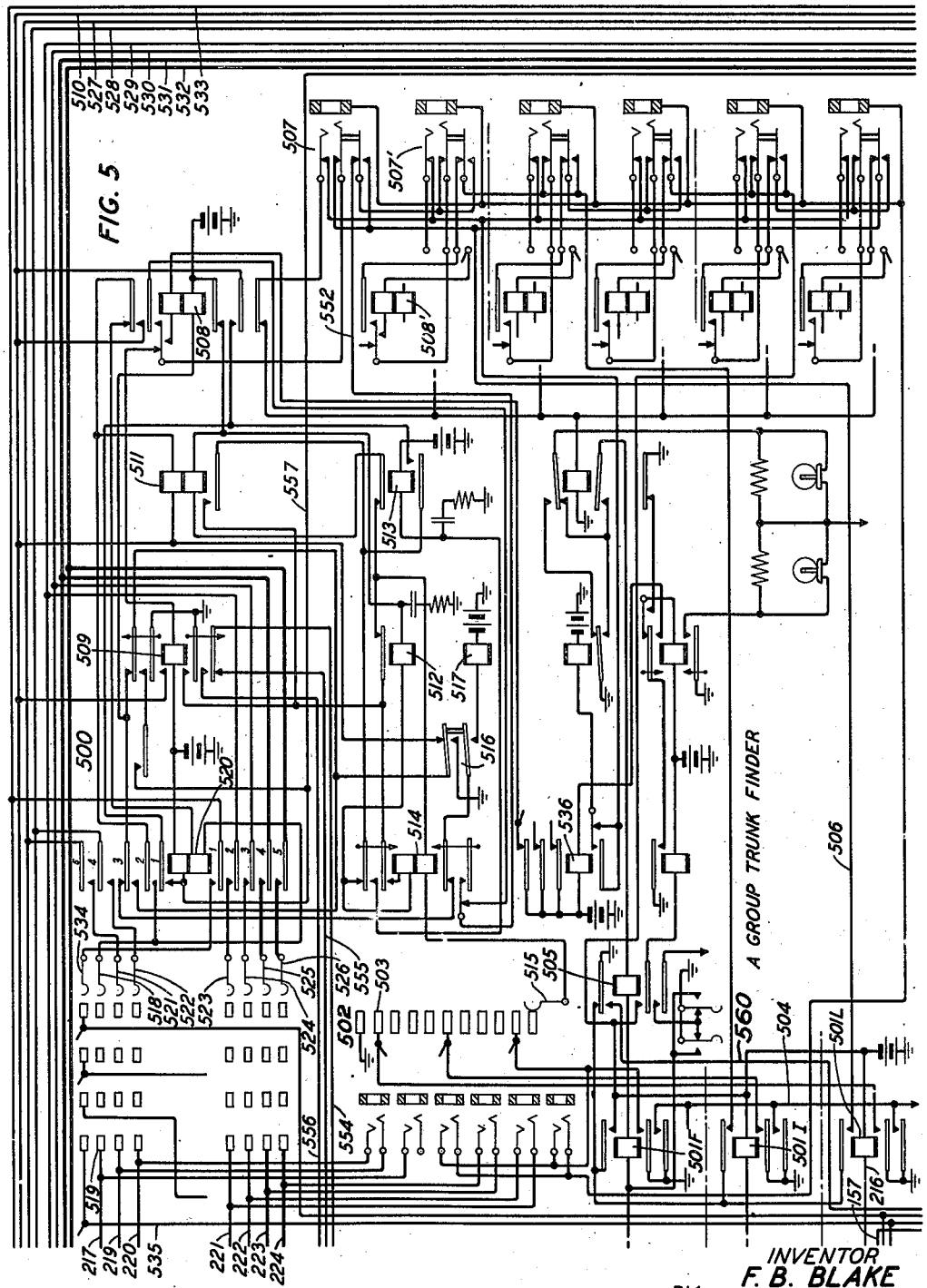
Figure 6:
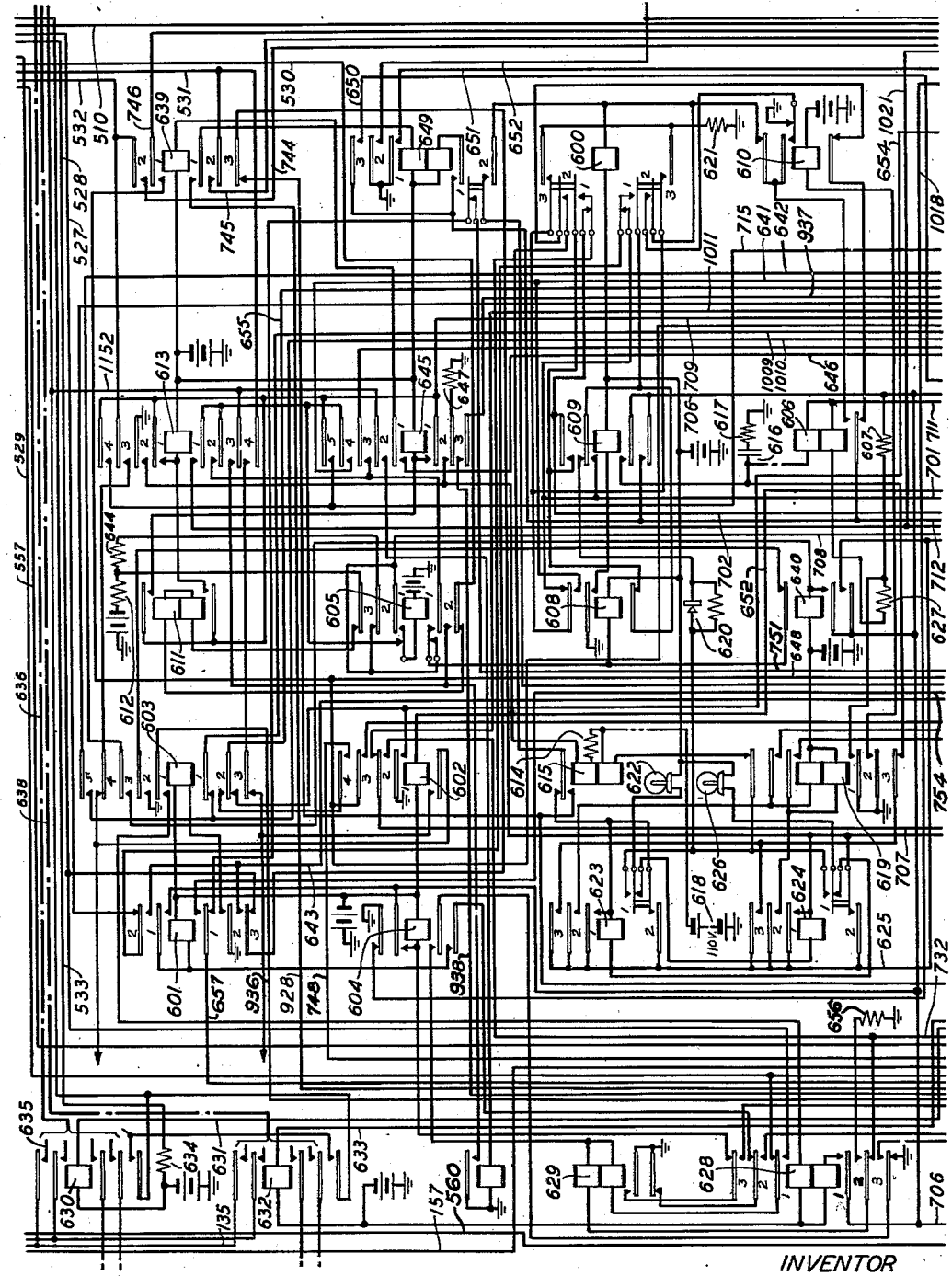
Figure 7:
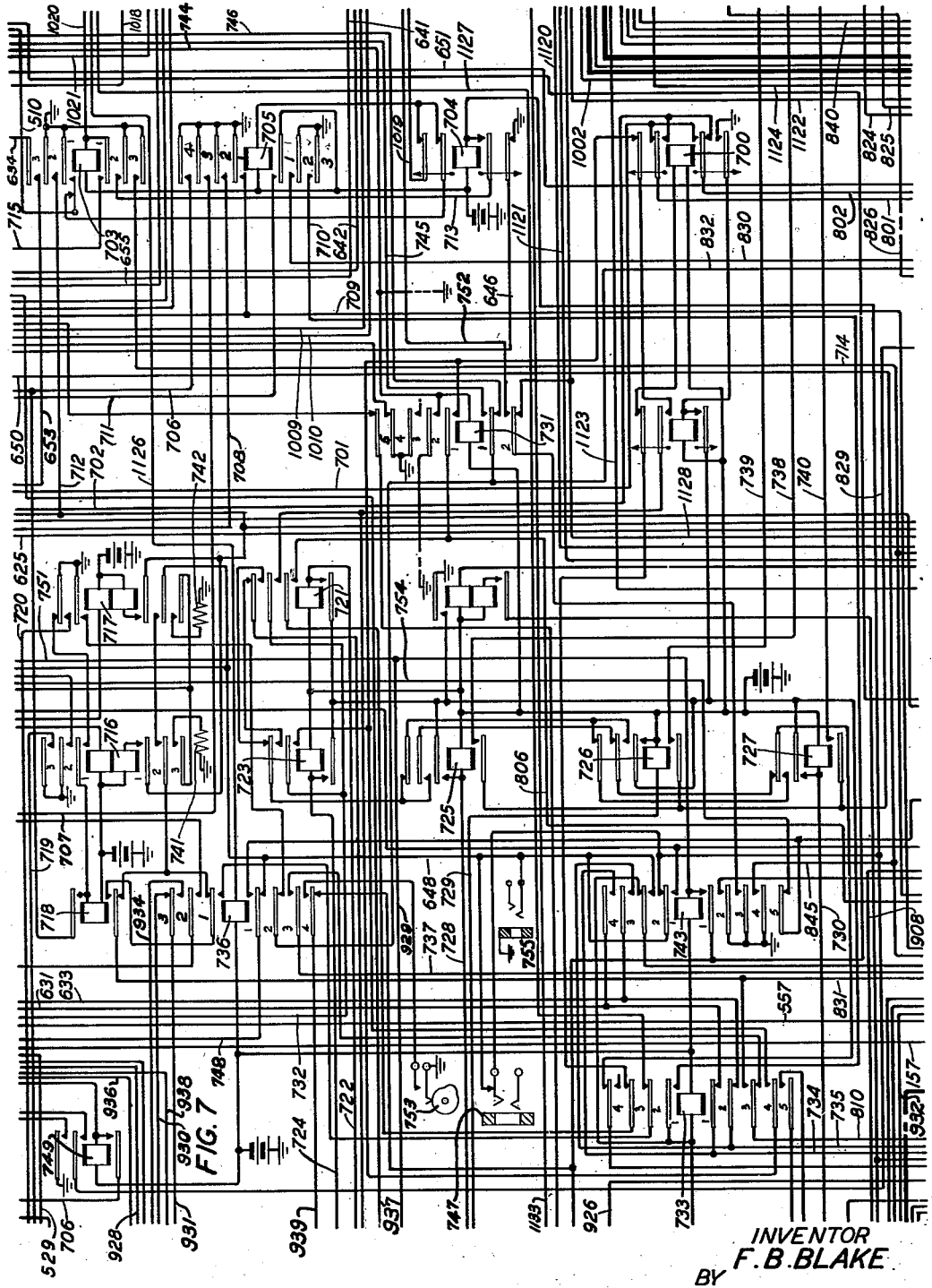
Figure 8:
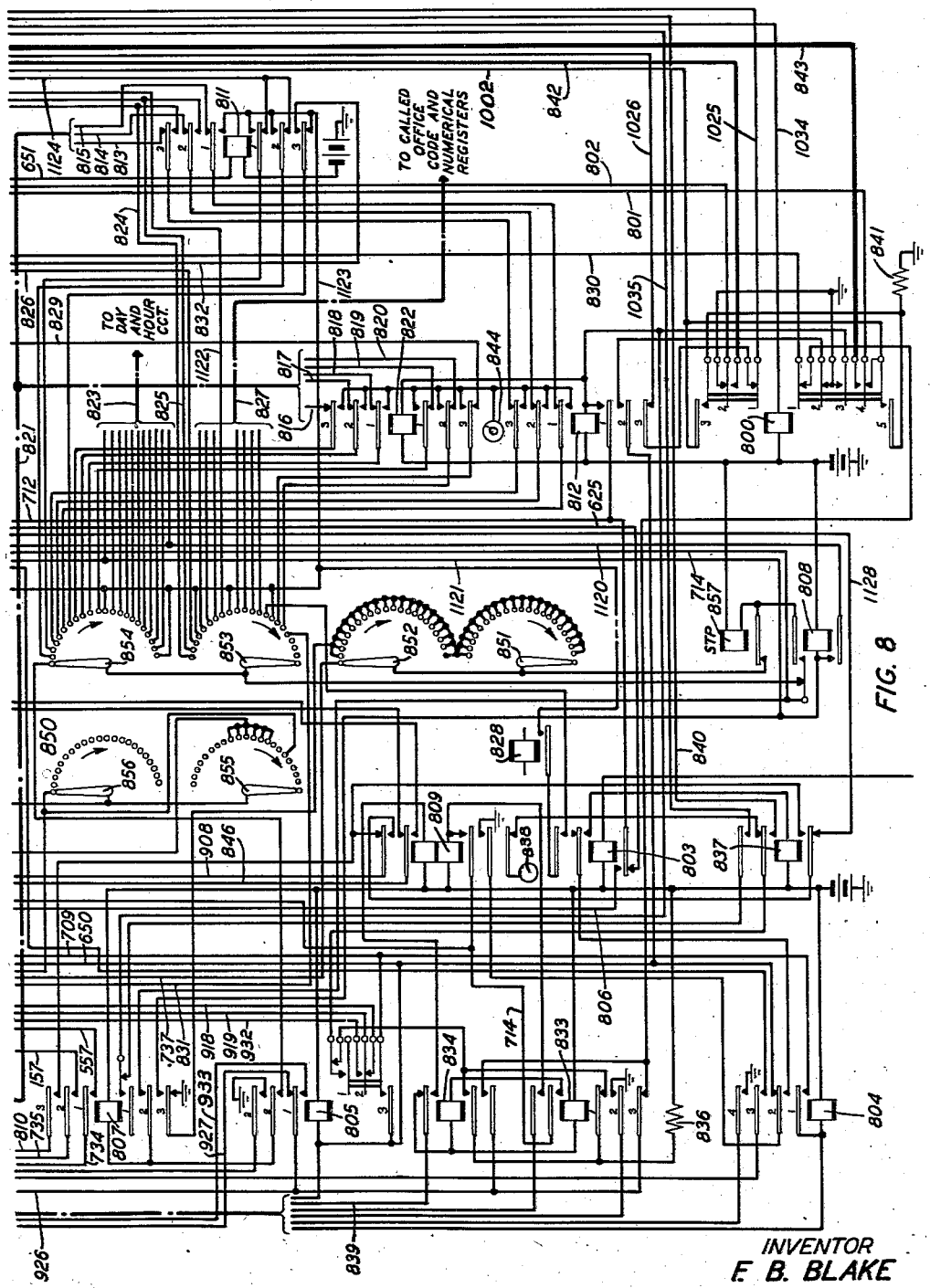

The trunk finder 500 disclosed in Fig. 5 is the first finder of the last group of finders allocated as first choice to the last subgroup of trunks to which the group relay 501L appertains. It will be assumed that this finder is idle and that therefore upon the operation of relay 501L, a circuit is established from ground over the back contact of relay 505, the upper contacts of relay 501L, in start conductor 506, over the middle normally closed contacts of the test and busy jack 507 of the trunk finder 500, the inner upper normal contacts of relay 508, through the winding of start relay 509 to battery and ground. Relay 509 upon operating connects ground over its inner upper front contact to conductor 510 and causes the operation of stepping relay 511 in a circuit extending from ground over the inner lower front contact of relay 509, interrupter contacts of vertical magnet 512, interrupter contacts of rotary magnet 513, the lower winding of relay 511 to battery and ground over the inner lower back contact of relay 508. Relay 511 upon operating causes the operation of the vertical stepping magnet 512, over a circuit extending from ground at the inner lower front contact of relay 509, over the front contact of relay 511, the upper back contact of relay 514, through the winding of magnet 512 to battery over the inner lower back contact of relay 508. The brush shaft of the finder is thereby lifted one step, placing the commutator brush 515 on the first wired segment of the vertical commutator 502. The vertical off-normal springs 516 are now operated to their alternate positions and the circuit of relay 511 is opened at the interrupter contacts of magnet 512. Relay 511 now releases in turn releasing magnet 512 which in turn recloses the circuit of relay 511. Relay 511 reoperates to cause the reoperation of magnet 512. In this manner magnet 512 is repeatedly operated and released to advance the brush shaft upwardly step by step until the commutator brush 515 engages the grounded segment 503 whereupon a circuit is established from ground on such segment over brush 515 through the lower winding and relay 514, over the interrupter contacts of rotary magnet 513, through the lower winding of relay 511 to battery and ground over the inner lower back contact of relay 508. Relay 511 is thus held operated to prevent further stepping and relay 514, which is slow to operate, operates after an interval sufficient to permit the brushes to cease vibrating following the completion of their last vertical stepping movement and before they are started in their rotary stepping movement.

When relay 514 operates, it locks in a circuit from battery over the inner lower back contact of relay 508 through the winding of magnet 512, through the upper winding and inner upper front contact of relay 514, to ground at the inner lower front contact of relay 509; opens at its inner lower back contact, the circuit extending over the lower contacts of the off-normal switch 516 through the winding of release magnet 517, and transfers the stepping circuit control of stepping relay 511 from the vertical magnet 512 to the rotary magnet 513. With stepping relay 511 now operated, the circuit of the rotary magnet 513 may be traced from ground over the inner lower front contact of relay 509, contacts of relay 511, upper front contact of relay 514, through the winding of magnet 513 to battery and ground. Relay 513, upon operating, advances the brush set of the finder one step in a rotary direction and opens at its interrupter contacts the holding circuit for relay 511 previously traced and the operating circuit thereof extending from ground over the inner lower front contact of relay 509, the interrupter contacts of magnet 512, the interrupter contacts of magnet 513, the lower winding of relay 511 to battery over the inner lower back contact of relay 508, whereupon relay 511 releases in turn releasing magnet 513. Magnet 513 upon releasing reestablishes the operating circuit of relay 511, which in turn reestablishes the circuit of magnet 513 to advance the brush set another step in the rotary direction. In this manner the brush sets are advanced step by step until the test brush 518 encounters the test terminal 519 of the calling trunk.

It has been assumed that the calling trunk of Figs. 2, 3 and 4 appears in the last terminal set of the levels of the banks of the trunk finder 500 corresponding to the commutator segment 503 which levels are partly shown and therefore when the brush sets have been stepped vertically to a position opposite such levels in their banks, as illustrated and have been advanced ten steps in the rotary direction into engagement with the last terminal sets of such levels, a circuit will be established from battery applied through the winding of relay 215 of the trunk over conductor 217, to the test terminal 519, thence over test brush 518, through the lower winding of relay 520, upper back contact of relay 508, through the upper winding of relay 511 to ground on conductor 510. Relay 511 is held operated over this circuit to prevent further rotary stepping of the switch shaft, and relay 520 operates sufficiently to close its upper No. 1 contacts thereby establishing a circuit from battery, through its upper winding, over such contacts, the lower contacts of rotary magnet 513, contacts of relay 511 to ground over the inner lower contacts of relay 509. With both of its windings now energized, relay 520 fully operates to extend control conductors 219 to 224, inclusive, of the trunk over brushes 521 to 526, inclusive, of the trunk finder and the upper Nos. 4 and 5 to lower Nos. 2 to 5 contacts of relay 520 to conductors 527 to 532, inclusive, extending to the sender; to cause the operation of relay 508 in a circuit extending from ground over the off-normal springs 516, the No. 3 upper front contact of relay 520, through the lower winding of relay 508 to battery and ground; to connect sender conductor 533 over its lower No. 1 contacts to brush 534, thence to conductor 535 which is multipled to corresponding bank terminals in the same vertical row of the upper finder bank; to open at its No. 3 upper back contact another point in the circuit of release magnet 517, and to prepare a locking circuit for itself over its No. 1 upper front contact which will be effective following the operation of relay 508.

Relay 508 upon operating extends a connection from trunk conductor 217, over terminal 519 and brush 518, the upper No. 2 contacts of relay 520 and the upper front contacts of relay 508 to conductor 510 extending to the sender; completes the locking circuit of relay 520 extending from battery through the upper winding and No. 1 upper contacts of relay 520, the lower front contact of relay 508 to ground on conductor 510; disconnects the lower winding of relay 520 from the test brush 518; transfers at its inner upper contacts the in-start conductor 506 from the winding of start relay 509 to the out-start conductor 552, and through the upper winding of relay 508 to battery at the upper back contact of relay 536; at its inner lower back contact removes battery from the windings of relay 511 and 514, and from the vertical magnet 512 and its upper front contact shunts the upper winding of relay 511. Relays 511 and 514 now release and relay 509 being slow to release releases after an interval sufficient to allow ground to be applied to conductor 510 at the sender to hold relay 520 and relay 215 of the trunk operated.

When relay 514 releases the continuity of the out-start conductor is established at its lower contacts whereby if a second trunk in the same subgroup should be in a calling condition, ground placed on the in-start conductor 506 will be effective to start the second trunk finder of the same subgroup of finders, if it is idle, over a circuit extending from conductor 506 over the middle normal contacts of test jack 507, the inner upper front contacts of relay 508, the lower normal contacts of relay 514, conductor 552, the lower normal contacts of test jack 507, the middle normal contacts of test jack 507' associated with the second trunk finder of the same trunk-finder group, over the upper normal contacts of relay 508' to the start relay of such second finder corresponding to relay 509.

Had the calling trunk been in the subgroup of a second or B group of one hundred trunks, a group relay 101L corresponding to one of the group relays 501, associated with the A group of trunk finders would have been operated to cause the operation of the start relay of an idle trunk finder such, for example, as the start relay 109 of the trunk finder 100 of Fig. 1. It is to be noted that the finder 500 is paired with the finder 100 and the brushes thereof are connectible to conductors 510 and 527 to 533, inclusive, to which the brushes of trunk finder 500 are also connectible and which extend to a sender. In order therefore that it may not be possible to connect two trunks to a single sender over the brushes of the pair of trunk finders 500 and 100, the finder 500 is made a preference finder and the start circuit for the finder 100 is extended from ground at the contacts of the group relay 101L over conductor 106, the inner upper normal contacts of relay 108 of the finder 100, conductor 554, over the lower back contact of relay 509 of finder 500, conductor 555, through the winding of start relay 109 of the finder 100 to battery. If the finder 500 is in use, its relay 509 will be operated and consequently the start circuit cannot be completed to start relay 109 of finder 100. However, the start circuit will be extended over conductor 554, the lower front contact of relay 509, conductor 556, over the inner upper normal contacts of relay 108 of the first available finder of the B group, thence over the back contacts of the relay 509 of the finder of the A group paired therewith, to the start relay 109 of such available finder if the paired A group finder is not in use or over a front contact of relay 509 and over contacts of similar relays 509 and 108 through the start relay 109 of a B group finder whose paired A group finder is not in use.

When the trunk finder seizes the terminals of the calling trunk and completes the circuit previously traced from battery through the winding of relay 215 over conductor 217, relay 215 operates and locks itself directly to ground applied over conductor 217 from the trunk finder and at a later time from the sender, over its upper No. 1 front contact. As soon as relay 302 releases following the completion of the registration of the impulse series in the digit register 350 a circuit is completed for transfer relay 209 which may be traced from battery through its winding, over conductor 213, the lower back contact of relay 306, the upper back contact of relay 302, conductor 307, the upper No. 2 front contact of relay 215, conductor 308, the upper contacts of off-normal switch 355 of register 350 to ground over the lower No. 3 back contact of relay 303. Relay 209 operates whereupon the dialing circuit previously traced over the calling line loop and through the windings of relay 207 is disconnected from the windings of such relay and transferred to the selected sender. Relay 207 now releases followed by the release of slow-to-release relay 211, but with relay 215 now operated, relay 300 is held operated over a circuit extending from battery through its winding, over conductor 301, the lower No. 1 contacts of relay 215 to ground over the lower No. 3 back contact of relay 210.

Should an idle sender not be connected to the trunk before the second train of impulses is received in the trunk, relays 215 and 209 will not be operated and, therefore, when relay 207 releases on the first impulse of this digit series a circuit will be established from ground over the upper No. 5 normal contacts of relay 209, the back contact of relay 207, the upper front contact of relay 211, conductor 212, the lower alternate contact of off-normal contacts 355, the inner upper back contact of relay 302, through the winding of relay 310 to battery, whereupon relay 310 operates and establishes a circuit from battery through the winding of relay 214, over conductor 311, the lower contacts of relay 310, to ground over the upper No. 2 back contact of relay 305. Relay 214 therefore operates, locks over its upper No. 1 contacts and conductor 312 to ground over the inner lower front contacts of relay 300; applies all-paths-busy tone from the source 230 over its lower No. 1 contacts, the tip conductor 200 of the trunk and thence to the calling line; connects ground over its lower No. 3 front contact, the normal contacts of jack 204 and thence as traced by conductor 202 to hold the selector 184 and the line finder 183 from releasing; at its lower No. 3 back contact removes ground from start conductor 216 extending to the trunk finder and at its lower No. 2 back contact opens the connection from ring conductor 220 extending over the lower No. 5 back contact of relay 210, over the lower No. 1 back contact of relay 232, the lower No. 2 back contact of relay 214, through resistance 231, over the lower No. 1 normal contacts of relay 209 to the tip conductor 219, whereby the sender, when attached, is given a disconnect signal.

In response to the all-paths-busy tone the calling subscriber restores his receiver to the switchhook, whereupon relay 207 releases followed by the release of relay 211 and the release of relay 300. With relay 214 operated the sender, if attached, will have received a disconnect signal and will thereby cause the release of relay 215 of the trunk. With relays 211, 215 and 300 all released, a circuit is established for release magnet 354 of digit register 350 which may be traced from battery through its winding, over conductor 313, the upper back contact of relay 211, the upper No. 2 back contact of relay 215, conductor 308, the upper contacts of off-normal springs 355 to ground over the lower No. 3 back contact of relay 303. Magnet 354 thereupon operates to release the brushes 351 and 352 of register 350 to their normal positions whereupon springs 355 restore to their normal position thereby opening the circuit of magnet 354. Relay 300, upon releasing, also releases relay 214. With relays 300 and 214 both released holding ground is removed from the winding of sleeve relay 203, which releases, and from sleeve conductor 202 to initiate the release of the operated selector 184 and line finder 183.

It will be assumed, however, that an idle sender is attached to the trunk prior to the receipt of the second impulse series in the trunk. Prior to the operation of transfer relay 209 a loop circuit is established from battery through the middle winding of dial impulse responsive relay 1000 of the sender, through retard coil 1001, conductor 1002, the lower No. 4 back contact of relay 800, conductor 801, the inner upper back contact of relay 700, conductor 701, the lower No. 1 normal contacts of relay 600, the lower No. 3 back contact of relay 601, conductor 528, the upper No. 4 contacts of relay 520, brush 522 of trunk finder 500, conductor 220, the lower No. 5 back contact of relay 210, the lower No. 1 back contact of relay 232, the lower No. 2 back contact of relay 214, resistance 231, the lower No. 1 back contact of relay 232, conductor 219, brush 521 of trunk finder 500, the upper No. 5 contacts of relay 520, conductor 527, the upper No. 2 back contact of relay 600, the upper No. 1 normal contacts of relay 600, conductor 702, the inner lower back contact of relay 700, conductor 802, the upper No. 2 back contact of relay 800, to ground. The retard coil 1001 in series with the middle or primary winding of relay 1000 and the condenser 1003 and resistance 1004 connected in parallel with the retard coil 1001 and middle winding of relay 1000 constitute an arrangement which enables relay 1000 to withstand transient conditions and thereby give satisfactory pulsing. The upper or secondary winding of relay 1000 is connected in series with condenser 1006 and resistance 1007 to reinforce the primary winding and make its operation and release more positive and therefore more insensitive to transients. The lower or tertiary winding serves as a biasing winding and tends to keep the relay armature in its released or back contact position.

At the time ground was connected to conductor 510 at the trunk finder 500, a circuit was completed over the upper No. 1 normal contacts of relay 703, over the inner upper normal contacts of relay 704, to battery through the winding of off-normal relay 705 whereupon relay 705 operates to connect ground to the off-normal ground conductors 706 to 710, inclusive, of the sender. Ground is, therefore, connected over conductor 707, the upper No. 2 back contact of relay 602 and conductor 1011 to the armature of relay 1000 and through the lower or biasing winding of relay 1000 and resistance 1012 to battery. As previously stated, relay 1000 is thus biased to hold its armature on its back contact to thereby shunt and discharge condenser 1013 through resistance 1014 until the dialing loop is completely through the middle winding of relay 1000 as previously traced.

When relay 1000 operates over the loop a circuit is established from ground on conductor 1011, over the front contact of relay 1000, conductor 1010, the lower No. 1 back contact of relay 603, conductor 1009, through the winding of relay 1008 and resistance 1007 to battery and in parallel with resistance 1007 to battery through the winding of relay 1015. Relay 1008 operates and releases with relay 1000 but relay 1015 being slow to release remains operated continuously during dialing and establishes an obvious circuit for relay 1016 which also remains operated during dialing and after relay 1015 releases on the trunk cut through.

Relay 1015, upon operating, also establishes a circuit from ground over its upper contacts, conductor 1019 and the upper back contact of relay 704 to battery through the winding of relay 705, to hold relay 705 operated and the ground is extended over the inner upper back contact of relay 704, and the upper No. 1 normal contacts of relay 703 to conductor 510, extending to the trunk finder 500 to replace ground applied to conductor 510 by relay 509, which latter relay releases after the trunk finder has found the calling trunk.

After the operation of transfer relay 209 of the trunk, conductor 219 of the loop circuit previously traced through the middle winding of relay 1000 is connected over the lower No. 1 alternate contacts of relay 209 and the upper No. 6 back contact of relay 210 to the tip conductor 200 of the ticketing trunk and conductor 220 is connected over the lower No. 5 back contact of relay 210, the lower No. 1 back contact of relay 232, the lower No. 2 back contact of relay 214, the lower No. 3 contacts of relay 209, the lower No. 2 back contact of relay 210, to the ring conductor 201 of the ticketing trunk, whereby relay 1000 is placed under the control of the calling subscriber. Upon release of relay 1008 in response to the first dial impulse received from the calling line, relay 1017 operates over a circuit from battery through its winding, over the back contact of relay 1098, the inner lower front contact of relay 1016, and conductor 1018 to ground at the upper back contact of relay 604 and, being slow to release, remains operated during an impulse series. Since the present invention is not concerned with the registration of series of dial impulses under the control of relays 1008, 1015, 1016 and 1017, the impulse counting relays controlled thereby and the digit registers for registering dialed digits are not disclosed. For a full disclosure of such apparatus and a description of the operation thereof, reference may be had to the application of J. W. Gooderham, Serial No. 448,782, filed concurrently herewith. With relay 1016 operated a circuit is established from ground over its lower front contact and conductor 1020 to battery through the winding of off-normal relay 703, which upon operating connects ground to off-normal conductors 712, 713 and 714 and connects ground directly over its upper No. 1 alternate contacts to conductor 510, extending to the trunk finder 500.

*Party identification test*

When off-normal relay 705 operated a circuit was established from battery over its lower No. 1 contacts, over conductor 711, through the lower winding of relay 606, and resistances 607 and 627, to ground on off-normal ground conductor 706, thus preparing relay 606 for operation and establishes a circuit for relay 608, which may be traced from battery through the winding thereof, over the lower No. 1 normal contacts of relay 605, to ground on off-normal ground conductor 708. Relay 608, upon operating, closes an obvious circuit over its inner upper front contacts through the winding of relay 609 to battery, whereupon relay 609 operates in turn establishing a circuit extending from battery on conductor 711, through the upper winding of relay 606, over the inner lower front contact of relay 609, to ground on conductor 706. With both windings energized, relay 606 operates and establishes a circuit from ground applied to conductor 712 upon the operation of off-normal relay 703, over the front contact of relay 606, the upper back contact of relay 610 to battery through the winding of relay 600. Relay 600, upon operating, locks over its lower No. 2 contacts to ground over the inner upper normal contacts of relay 610. These relays all remain operated under the control of relay 605.

When the sender was cut through to the calling trunk by the operation of relay 520 of the trunk finder 500 a circuit was established from ground over the upper No. 3 back contact of relay 203, conductor 246, through the winding of trunk connector relay 1100 individual to the calling trunk of the sender-trunk-connector circuit of Fig. 11, over conductor 222, brush 524 on the trunk finder, the lower No. 3 contacts of relay 520, conductor 530, the lower No. 2 back contact of relay 605, through the windings of the three-position polarized relay 611, the upper No. 3 back contact of relay 605, through resistance 612 to battery and ground. Relay 611 operates over this circuit in such a manner as to close its lower contacts whereupon relay 613 operates in a circuit from battery through its winding, over the lower contacts of relay 611, to ground on off-normal ground conductor 709, locks over its upper No. 1 contacts to ground on conductor 709, and establishes a biasing circuit from the 110-volt battery 618, through resistance 614 and the upper winding of relay 615, over its upper No. 2 contacts to ground, whereby relay 615 is prepared for operation.

When relay 1017 operates at the start of the first digit to be registered in the sender, a circuit is established from ground over a front contact thereof, over the front contact of an in-steering relay (not shown), conductor 1021, the lower No. 1 contacts of relay 613, over the upper No. 1 normal contacts and through the winding of relay 605 to battery. Relay 605 thereupon operates, locks over its upper No. 1 alternate contacts to ground on off-normal ground conductor 708, and transfers the holding circuit for relay 608 over its lower No. 1 transfer contacts from ground on the off-normal ground conductor 708 to ground applied to conductor 1021 by relay 1017 over the lower Nos. 1 and 2 contacts of relay 613. When relay 1017 releases at the end of the first digit series dialed into the sender, relay 608 releases, in turn releasing relay 609, which opens the circuit of condenser timed relay 606. With relay 609 released a shunt extending from ground on conductor 706, over the inner lower front contact of relay 609, through condenser 615 and resistance 617 to ground is opened and condenser 616 now starts to charge in a circuit from battery, over conductor 711, through the upper winding of relay 606, through condenser 616 and resistance 617 to ground, and until the condenser becomes fully charged and the charging current therethrough ceases to flow, relay 606 is maintained operated.

With relays 608 and 609 both released and until relay 606 finally releases, a circuit is established from the source 618 of 110-volt current, through the lower winding of relay 615, the upper back contact of relay 619, through the rectifier 620, over the upper back contact of relay 609, the lower No. 1 alternate contacts of relay 600 and thence as traced to the ring conductor 201 of the ticketing trunk and to the ring conductor 188 of the calling line, and in parallel over the lower back contact of relay 608, and the upper No. 1 alternate contacts of relay 600, and thence as traced to the tip conductor 200 of the ticketing trunk, and to the tip conductor 189 of the calling line. During the time that the lower winding of relay 615 is thus connected to the tip and ring conductors of the calling line pulse receiving relay 1000 is maintained operated in the circuit previously traced from battery through its middle winding to conductor 701, thence over the upper back contact of relay 608, over the upper and lower No. 3 contacts of relay 600 to ground through resistance 621.

Relay 606 is timed by the condenser 616 and resistance 617 to release in approximately .05 second after the release of relay 609 and, therefore, the lower winding of party test relay 615 is connected to the conductors of the calling line for this interval. If the calling subscriber is a tip party of a two-party flat rate line, relay 615 will be operated over the 3640-ohm resistance ground at such tip station. It having been assumed that the tip party station 181 has initiated the call it will be noted that with the receiver off the switchhook the tip conductor 189 of the calling line is connected through the primary winding of the substation repeating coil 190, through the 3640-ohm ringer 191 to ground and that the ring conductor 188 is connected through the normal contacts of the dial 192, through the transmitter 193 and ringer 191 to ground. Relay 615, if operated, establishes a circuit from battery through resistance lamp 622, over the lower No. 1 back contact of relay 623, through the winding of relay 624, over the lower back contact of relay 639, the front contact of relay 615, the upper No. 2 contacts of relay 600, the lower back contact of relay 610, the lower back contact of relay 606 to ground on off-normal ground conductor 712. Relay 624, upon operating, locks over its upper No. 1 contacts, conductor 625, the lower back contact of end-of-dialing relay 803 to ground on off-normal ground conductor 712; establishes the operating circuit of relay 606 from ground on conductor 625, over its upper No. 3 contact, the lower No. 3 back contact of relay 619, through the upper winding of relay 606 to battery on conductor 711; establishes a circuit from ground on conductor 625, over its upper No. 2 contacts, through the lower winding of relay 619 to battery; opens at its lower No. 1 back contact the operating circuit of relay 623, and at its lower No. 1 front contact connects battery through lamp 626 and over the upper No. 3 back contact of relay 619 to the line side of the lower winding of relay 615.

Relay 619, upon operating, extends its operating ground over its upper No. 1 contacts and through the upper winding of relay 716 to battery; connects ground over its lower No. 1 contacts to shunt resistance 607 from the circuit through the lower biasing winding of timing relay 606; opens the circuit through the upper or operate winding of relay 606; disconnects the 110-volt source of current 618 from the subscriber's line and establishes the circuit of relay 610 extending from ground over its lower No. 2 contacts to battery through the winding of relay 610. With resistance 607 shunted relay 606 releases approximately .015 second following the opening of its operating circuit and until it releases relay 600 is held operated over its own lower No. 2 contacts, the inner upper alternate contacts of relay 610 and the front contact of relay 606 to ground on off-normal conductor 712. During the time that relay 606 remains operated current from the 48-volt central office battery is applied through lamp 626, over the lower No. 1 front contact of relay 624, through rectifier 620, the upper back contact of relay 609 and in parallel over the lower back contact of relay 608, and thence as traced over the No. 1 upper and No. 1 lower alternate contacts of relay 600 to the calling line. When relay 606 releases it in turn releases relay 600 and disconnects the source from the line. This application of current from the 48-volt battery is for the purpose of discharging the line in such a way as to prevent bell tapping at the substation.

With relay 600 released the previously traced circuit over the calling line and through the middle winding of relay 1000 is reestablished and the local holding circuit for relay 1000 is opened. The party identification is now completed and the sender is ready to receive the next digit series dialed by the subscriber. A complete test cycle, that is, testing the line, discharging the line after the test, and the functioning of the test control relays as just described, is such that the open period introduced into the dialing circuit does not exceed .150 second.

If the calling substation is not a tip party of a two-party flat rate line, relay 615 will not operate when relay 606 releases for the first time. With relay 615 unoperated, when relay 606 releases a circuit is established from ground on conductor 712, over the back contact of relay 606, the lower back contact of relay 610, the upper No. 2 contacts of relay 600, the back contact of relay 615, the winding of relay 623, over the lower No. 1 back contact of relay 624, through lamp 626, to battery. Relay 623 thereupon operates causing the operation of relays 619 and 717 in the manner previously described in connection with the operation of relays 619 and 716. The circuit then functions in the manner previously described.

At the end of the party identification test relays 610, 619 and 624 remain operated if the calling party is the tip party of a two-party flat rate line under the control of the end-of-dialing relay 803 and relay 716 is held operated in a circuit over its lower winding and lower No. 1 contacts to ground on off-normal conductor 712 under the control of off-normal relay 703. With relay 716 operated relay 718 is operated from battery through its winding, over the upper No. 1 contacts of relay 716, and the upper No. 2 back contact of relay 717 to ground and relay 718 is held operated over its upper contacts to ground on off-normal conductor 706 under the control of off-normal relay 705. If the calling party is not a tip party, relays 610, 619 and 623 remain operated under the control of relay 803, and relay 717 is held operated in a circuit over its lower winding and lower No. 1 contacts to ground on conductor 712 under the control of relay 703.

When the first digit has been received in the sender, an idle identifier, such as is disclosed schematically by the box 900 on Fig. 9, is associated with the sender by an identifier-connector and the identifier is associated with the calling ticketing trunk by an identifier-trunk-connector circuit. If, as a result of the party test, relay 716 has been operated, a circuit is established from ground over its upper No. 3 contacts and conductor 719, thence over contacts of the identifier-connector to the identifier 900 to operate a tip party relay therein to register the fact that the tip party on a two-party flat rate line has initiated the call. If ring party relay 717 has been operated, a circuit would be established from ground over its upper No. 2 contacts and conductor 720, extended over contacts of the identifier-connector to the identifier 900 to operate a ring party relay therein. Upon the operation of the identifier-trunk-connector a circuit is established for relay 218 of the trunk which may be traced in part from the identifier 900, over conductor 901 extended over contacts of the identifier-connector to conductor 529, thence over the No. 2 lower contacts of relay 520, trunk-finder brush 523, conductor 221, through the winding of the three-position polarized relay 218 of the trunk, over the upper No. 4 contacts of relay 215, and through resistance 238 to battery and over the upper No. 3 contacts of relay 215, through resistance 254, over conductor 255, over the upper No. 1 contacts of relay 303, conductor 314, the lower contacts of off-normal switch 405 of the tens elapsed time register 400, lower No. 1 back contact of relay 406, to ground over the normal position terminal of the arc of register 450 with which brush 451 is engaged if this register is in its normal position. If the registers 400 and 450 are both in their normal positions and the relay 406 is not at the time operated, relay 218 now operates to complete the extension of control conductors from the trunk to the sender.

A circuit is now effective for transferring the registration of the digit register 350 of the trunk which may be traced in part from battery applied at the identifier over contacts of the identifier-trunk-connector, thence over conductor 234, the upper No. 2 contacts of relay 218, conductor 315, brush 351 assumed to be standing on the No. 2 terminal of its arc and a conductor of cable 316 extending over contacts of the identifier-trunk-connector to ground through the winding of a trunk code register relay of the identifier. A circuit is also established which may be traced in part from battery applied at the identifier over contacts of the identifier-trunk-connector thence over conductor 235, the upper No. 5 contacts of relay 218, the lower normal contacts of test jack 256, over the inner lower contacts of sleeve relay 203, code lead 236 and contacts of the identifier-trunk-connector to the identifier. If the first digit registered in the sender was the third code digit, as it has been assumed, then this digit is transferred to the identifier from the sender. The identifier then has all of the information required to reconstruct the called office code dialed by the subscriber; the information concerning the first code digit being transmitted to the identifier by the code lead 236, the information concerning the second code digit being transmitted from the trunk register 350 and the information concerning the third code digit being transmitted from the sender. After the reconstruction of the office code digits of the called office, this information is transmitted from the identifier to the sender and registered in the sender as fully described in the Gooderham application Serial No. 448,782, hereinbefore referred to. Relay 218 at its upper No. 1 back contact opens the shunt around retard coil 233 and at its upper No. 1 alternate contacts extends a connection from sleeve conductor 202 of the trunk, over the lower contacts of sleeve relay 203, the upper contacts of relay 203, the lower normal contacts of jack 204, the upper No. 1 alternate contacts of relay 218, over conductor 239 and thence over contacts of the identifier-trunk-connector to the identifier over which circuit the identifier applies 270-cycle identifying tone current towards the calling line.

Following the association of the identifier with the trunk, the identifier is started to identify the calling line and looks for such line in a tip party field if the tip party register relay of the identifier was operated or in a ring party field if the ring party register of the identifier was operated. As soon as the identification of the calling line is completed and the necessary information concerning the identity of the calling office, the numerical digits of the directory number of the calling line and the class of the calling line have been registered in the identifier, this information is transferred to the sender and results in the setting of register relays therein. One register is set in accordance with the calling office unit in which the calling line is located from the setting of which the three office code digits of the calling line number may be secured and four other registers are set to register the thousands, hundreds, tens and units numerical digits of the calling line number. If the call was initiated from a two-party message rate line relay 721 is operated over conductor 722, extended over contacts of the identifier-connector to the identifier 900, or if the call did not originate on a two-party message rate line, relay 723 is operated over conductor 724 extended over contacts of the identifier-connector to the identifier. One of class relays 725, 726 and 727 may be operated over conductors 728, 729 and 730, respectively, extending over contacts of the identifier-connector to the identifier, in accordance with whether the calling subscriber is entitled to local service only, extended service or foreign exchange service.

When all of the digits of the called line number have been transferred to the called office code and numerical registers of the sender a check test is made to determine if the proper number of relays of each register have been operated and, if so, relay 804 operates and locks to ground on off-normal ground conductor 709. When all of the calling line number and class information has been transferred to the sender a second check test is made to determine if the proper number of register relays have been operated and if so relay 805 operates and locks in a circuit from battery through its winding over its lower No. 3 contacts to ground on conductor 709.

Following the registration of the called office code digits in the sender, the sender proceeds to control the completion of the connection to the wanted line in accordance with the office code and numerical digits of the wanted line number. When the last digit of such called line number has been dialed into the sender, relay 803 operates and when the last series of impulses has been sent from the sender to set a connector upon the terminals of the wanted line, the end of pulsing relay 731 is operated and locks over its upper No. 2 contacts. It is desirable to cut the ticketing trunk through to the transmission condition as soon following the completion of out-pulsing as possible so that there will be no unnecessary delay to the calling subscriber in the completion of the call. Since, as assumed, the call is not from a two-party message rate line and relay 723 is therefore operated, a circuit is established from ground on conductor 712, over the lower front contact of end-of-dialing relay 803, conductor 806, the upper No. 1 front contact of relay 731, the inner upper front contact of relay 723, conductor 732, the lower No. 2 back contact of relay 628 through both windings of relay 629 in series, over the upper No. 1 back contact of relay 628, conductor 529, the lower No. 2 contacts of relay 520 of trunk finder 500, brush 523, conductor 221, through the windings of polarized relay 218 and thence as traced to battery through resistance 238. Due to the inclusion of both windings of relay 629, relay 218 in the trunk does not operate at this time; but relay 629 operates and establishes a circuit from battery through the winding of relay 604, over the upper No. 3 back contact of relay 628 to ground at the front contact of relay 629. Relay 604 therefore operates and locks over its upper front contact to ground on off-normal ground conductor 706 and connects ground over the lower No. 3 back contact of relay 628, over its inner lower front contact to a point between the two windings of relay 629 whereupon the lower winding of relay 629 becomes shunted and sufficient current is permitted to flow through the windings of relay 218 of the trunk to cause the latter relay to operate in the positive direction to operate its lower contacts.

Relay 218 thereupon establishes a circuit over its lower No. 2 front contact for cut-through relay 210 which operates and locks over its upper No. 1 contacts, conductor 237 to ground over the upper front contact of relay 300. This locking ground is also applied over the upper No. 2 contacts of relay 210 to conductor 221 and thence over the circuit previously traced through the upper winding of relay 629 to ground whereby the upper winding of relay 629 is shunted and relay 629 releases. With relay 629 released and relay 604 operated, a circuit is established from battery through the winding of relay 601, over the lower contacts of relay 604, the upper No. 2 back contact of relay 628 to ground at the back contact of relay 629 and relay 601 operates and locks over its upper No. 1 front contact to ground on conductor 706 and establishes an obvious circuit for relay 603 over its lower No. 2 front contact. Relay 603 upon operating opens the out-pulsing circuit at its upper No. 4 and lower No. 3 back contacts, extending over the upper No. 3 and lower No. 4 front contacts of relay 613, over conductors 532 and 531, the lower Nos. 4 and 5 contacts of trunk finder relay 520, brushes 525 and 526, conductors 223 and 224, the upper and lower Nos. 2 front contacts of relay 209 and normal contacts of test jack 240 to conductors 317 and 318 of the ticketing trunk terminating in an incoming selector and over which circuit impulses have been transmitted from the sender to set selector switches. Relay 601 at its upper No. 2 and lower No. 3 back contacts opens the dialing loop previously traced from the calling line to ground and to battery through the middle winding of impulse responsive relay 1000 and establishes a holding loop for relay 1900 over its upper No. 2 and lower No. 3 front contacts whereby relay 1000 of the sender is maintained operated after its previously traced circuit has been opened through the operation of cut-through relay 210 of the trunk.

To check the ability of the party test relays to function properly and particularly to insure against faulty operation of the party test relay 615, the test relays are tested before the sender is released and following the operation of relays 601 and 603. When relay 603 operates a circuit is established from ground over its upper No. 2 contacts and the back contact of relay 640 to battery through the winding of relay 608 whereupon relay 608 operates in turn causing the operation of relays 606 and 609 and, since relays 624, 619 and 610 all released at the end of dialing when relay 603 operated and removed ground from conductor 625, relay 600 is now reoperated following the operation of relay 606 in the manner previously described and locks over its lower No. 2 contacts and over the upper normal contacts of relay 600. With relay 610 operated a circuit is now effective from ground through resistance 621, over the upper and lower No. 3 contacts of relay 600, the upper front contact of relay 608, conductor 641, the back contacts of relay 1015, conductor 642, the upper No. 3 contacts of relay 603 to battery through the winding of relay 640. Relay 640 thereupon operates, locks over its inner lower front contact to ground on off-normal conductor 706 and opens the operating circuit of relay 608 which thereupon releases followed by the release of relay 609. Relay 609 upon releasing in turn initiates the release of timing relay 606 which completes its release after a .05 second interval.

With relays 608 and 609 both released, relay 601 operated, and until relay 606 finally releases, a circuit is established from the source of current 618 through the lower winding of test relay 615, over the upper back contact of relay 619, through the rectifier 620, over the upper back contact of relay 609, the lower No. 1 alternate contacts of relay 600, the lower No. 3 front contact of relay 601, conductor 643 and over the lower No. 3 contacts of relay 716 through resistance 741 to ground, since relay 716 has been operated in response to the previous party test, and in parallel over the lower back contact of relay 608 and the upper No. 1 alternate contacts of relay 600, the upper No. 2 front contact of relay 601 and over conductor 643 and the lower No. 3 contacts of relay 716 through resistance 741 to ground. This is a non-operate condition for relay 615 and as a result of relay 615 not operating relays 623, 619, 610 and 717 are operated in the manner previously described in connection with a ring party test. If relay 615 fails on this test, that is, if it operates on its non-operate condition, relay 717 will not operate and the sender will be prevented from releasing.

Had relay 717 been operated on the party line test indicating a ring party station call, then the test of relay 615 just described would proceed in the same manner except that the circuit for relay 615 would be established from ground through resistance 742 and over the lower No. 3 contacts of relay 717. If the relay 615 is in proper adjustment, it should operate resulting in the operation of relay 716 as previously described. If, however, relay 615 does not operate, relay 716 will not operate and the sender will be prevented from releasing.

Relay 210 also at its upper and lower back contacts opens the dialing loop extending from the calling line to the sender and at its upper No. 6 and lower No. 2 front contacts connects the calling line, extended to tip and ring conductors 200 and 201, to the windings of supervisory relay 319. Relay 319 now operates in a circuit which may be traced from the tip trunk conductor 200 over the upper No. 6 contacts of relay 210, conductor 320, through the upper left winding of repeating coil 321 and the upper No. 4 back contact of relay 322 to ground through the upper winding of relay 319 and from the ring conductor 201, over the lower No. 2 front contact of relay 210, conductor 323, through the lower left winding of repeating coil 321 and over the upper No. 3 back contact of relay 322 to battery through the lower winding of relay 319. Relay 319 operates and closes a circuit for holding relay 300 operated which may be traced from battery through the winding of relay 300, over the contacts of relay 319 to ground over the inner lower contacts of relay 300. With relay 210 operated the original operating circuit for relay 300 is opened at the lower No. 3 back contact of relay 210 so that relay 300 is now held operated entirely under the control of the calling subscriber to control the holding of the trunk. Relay 210 also establishes a circuit extending to the called subscriber's line which may be traced in part from tip conductor 317 over the upper normal contacts of jack 240, the upper No. 4 contacts of relay 210, conductor 324, through the upper right winding of repeating coil 321, the winding of polarized supervisory relay 325, conductor 326, the upper No. 3 back contact of relay 214, the lower No. 3 back contact of relay 232, conductor 327, the lower right winding of repeating coil 321, conductor 328, the lower No. 4 contacts of relay 210 and over the middle normal contacts of jack 240 to ring conductor 318. Relay 325 being polarized does not receive current in the right direction at this time to cause its operation.

*Response of the called subscriber*

When the called subscriber answers, the direction of current flowing through the winding of supervisory relay 325 is reversed whereupon relay 325 operates in turn establishing a circuit from battery through the winding of reversing relay 306 to ground over the front contact of relay 325. Relay 306 upon operating connects ground over its lower No. 2 contacts and the circuit previously traced to the sleeve conductor 202 of the trunk to replace the ground supplied to such circuit over the lower No. 2 back contact of relay 303 after relay 303 operates as will be presently described. As soon following the operation of relay 306 as ground is applied over conductor 329 at the miscellaneous interrupter frame, a circuit is completed over the lower No. 2 normal contacts of relay 330, over conductor 331, the upper No. 3 front contact of relay 210, conductor 332, the lower No. 3 front contact of relay 306 and over the upper No. 3 back contact of relay 303 to battery through the lower winding of relay 330. Relay 330 thereupon operates, locking to the direct ground over its lower No. 2 alternate contacts and connecting ground over its upper No. 4 contacts and over the upper No. 3 back contact of relay 305 to start conductor 333 extending to the miscellaneous interrupter frame to start the measurement of a time interval. After two seconds delay, ground will be applied to conductor 334 at the interrupter frame thereby completing a circuit over the upper No. 3 contacts of relay 330, through the upper No. 1 normal contacts and winding of relay 305 to battery whereupon relay 305 operates and locks over its upper No. 1 alternate contacts, over the upper No. 2 back contact of relay 322 and conductor 335 to ground over the upper No. 1 normal contacts of relay 209, which released when its operating circuit was opened at the lower No. 4 back contact of relay 306 upon the operation of the latter relay.

Timing the conversation

With relay 305 operated a circuit is established from ground over a contact of relay 336, which is operated once every fifteen seconds by the telechron clock-operated timer 337, over conductor 338, over the upper normal contacts of test jack 256, conductor 339, the lower No. 5 contacts of relay 305, lower No. 2 back contact of relay 322 and over the upper No. 1 contacts and through the upper winding of relay 330 to hold such relay operated and over the upper No. 2 contacts of relay 330, conductor 340 to battery through the winding of stepping magnet 457 of the units timing register 450. Thus at fifteen-second intervals the brushes of such timing register are advanced step by step. If the conversation continues until the register 450 advances its brushes 452, 454 and 456 to the No. 38 terminals of their associated arcs, a circuit will be closed from ground applied to conductor 340, thence as traced through the winding of the stepping magnet 457 of register 450 and also over the upper No. 2 back contact of relay 406, over brush 456 and the No. 38 terminal of its arc, over the lower No. 3 back contact of relay 406 to battery through the winding of stepping magnet 403 of the tens timing register 400. The operation of magnet 403 will advance register 400 one terminal thereby causing register 400 to advance one step for each revolution of register 450. In this manner register 450 is used as a measure of the units of conversation time while register 400 measures the tens. The terminals 1, 39 and 40 on the arcs of the units register 450 are passed by when the tens register 400 has made one step or more until register 400 reaches its tenth step position. The units register 450 always passes by its No. 22 position terminal by the establishment of a circuit from ground on brush 451, over the No. 22 position terminal of its arc and over the interrupter contacts and through the winding of stepping magnet 457 to battery. The advance of registers 400 and 450 continues in this manner throughout the conversation until 99 minutes have elapsed at which time, after printing 99 on the ticket, the registers are restored to normal and another cycle of 99 minutes is begun and proceeds as above described.

Operation of sender-trunk-connector

After the identifier transmitted all of the information to the sender required for the completion of the connection, relay 805 was operated as a signal to the sender to complete the establishment of the connection. Relay 805 upon operating locked over its lower No. 3 contacts to ground on conductor 109, caused the release of the identifier and established a circuit for relay 807 extending from battery through its winding, over the upper No. 2 contacts of relay 805, over the normal position terminal of the arc of switch 850 with which brush 854 should be engaged if the switch is in its normal position, over the normal contacts of stepping relay 808 to ground on off-normal ground conductor 714. Relay 807 upon operating locks over its lower No. 2 contacts to ground on conductor 714 and with relay 805 operated, establishes a circuit which may be traced from battery through the winding of relay 630, over conductor 631, the lower No. 1 back contact of relay 733, conductor 734, the upper No. 1 contacts of relay 807, conductor 557, over the upper No. 1 contacts of relay 520 of the trunk finder, over the lower front contact of relay 508 to ground applied to conductor 510 from the sender. Had the calling trunk been selected by the B group trunk finder 100, a similar circuit would have been established for relay 632, over conductor 633, the lower No. 2 back contact of relay 733, conductor 735, the upper No. 2 contacts of relay 807 and conductor 157 over contacts of a relay of trunk finder 100 corresponding to relay 520 and thence to ground on conductor 510 at the sender.

Relay 630 upon operating establishes a circuit which may be traced from battery through resistance 634, over conductor 533, thence over the lower No. 1 contacts of relay 520, brush 534 of trunk finder 500, conductor 535, the upper contacts of relay 630, conductor 635 of cable 636, allocated to the group of ten ticketing trunks appearing in the tenth vertical group of the banks of trunk finder 500 and in which group the calling trunk is located, through the winding of lock-out relay 1130F of the sender-trunk-connector circuit A of Fig. 11, allocated to the first sender assumed to be in use for the connection and to the vertical group of trunks in which the calling trunk is located, thence to ground over the inner upper normal contacts of lock-out relays of all other senders having access to the same group of trunks if the sender-trunk-connector circuit is not being used by another sender. Relay 1130F operates, locks over its upper alternate contacts to ground, establishes an operating circuit for the multicontact connector relay 1131F from ground through the winding of such relay over the inner lower front contacts of relay 1130F, through resistance 1150 to battery, and establishes a circuit from battery through resistance 1151 over the middle upper front contact of relay 1130F, conductor 1152, over the lower No. 3 front contact of relay 613, the lower No. 2 front contact of relay 605, conductor 530, over the lower No. 3 contact of relay 520 and brush 524 of trunk finder 500, conductor 222, through the winding of multicontact relay 1100 and conductor 246 to ground over the upper No. 3 back contact of relay 208.

With multicontact relays 1131F and 1100 now both operated, a plurality of circuit paths is established from the ticketing trunk to the sender for the purpose of transferring registered information from the sender to the ticket printer 460 of the trunk.

It is to be noted that ten subgroups of ten trunks each of the A group of one hundred trunks appear in the vertical rows of terminal sets of the banks of the trunk finders of the A group and that each of the sender-trunk-connector circuits, of which one is disclosed in Fig. 11, serves a group of ten trunks, such connector circuit having a relay such as 1131F for each sender and ten relays, such as 1100, for the ten trunks of the subgroup which it serves. Nine similar sender-trunk-connectors would be provided to serve the other nine subgroups of trunks. Similarly ten sender-trunk-connector circuits are provided in a B group to serve the ten subgroups of trunks of the B group which appear in the vertical rows of terminal sets of the banks of the trunk finders of the B group, such as finder 100. One of such B group sender-trunk-connector circuits is disclosed in Fig. 12. Had the calling trunk been in a subgroup of the B group of trunks and sender relay 632 been operated, then a circuit would have been established from battery through resistance 634, over conductor 533, thence over the lower No. 1 contacts of the relay of trunk finder 100 corresponding to relay 520, a brush of such finder, over conductor 135, the upper contacts of relay 632, conductor 637 of cable 638, through the winding of lock-out relay 1230F allocated to the first sender and to the sender-trunk-connector circuit of Fig. 12, thence over the inner upper normal contacts of other lock-out relays to ground. Relay 1230F upon operating causes the operation of multicontact relay 1231F and the operation of such relay together with a relay, such as 1200, individual to the calling trunk, extends control conductors from the sender to the ticket printer of the trunk.

With relays 1100 and 1131F both operated, a circuit is established from ground over the No. 18 contacts of such relays and conductor 1126 to battery through the winding of relay 736. Relay 736 now operates as a signal to the sender that connections have been established to the trunk through the operation of a sender-trunk-connector circuit. With relay 736 now operated a circuit is established from ground on the off-normal ground conductor 710, over the lower back contact of timing relay 903, conductor 908, the upper back contact of relay 809, the upper No. 3 contact of relay 807, conductor 810, the lower No. 3 back contact of relay 733, the lower No. 3 contacts of relay 736, conductor 737, brush 852 of switch 850 and the normal terminal of its associated arc, through the winding and interrupter contacts of stepping magnet 857 to battery. Magnet 857 thereupon operates and releases to advance the brushes of switch 850 one step whereupon the circuit of magnet 857 is opened at brush 852.

*Initiation of ticket printing*

With the brushes 852, 854 and 856 of switch 850 on the No. 2 terminals of their arcs and the printer control conductors 410 to 425 extended over contacts of relays 1100 and 1131F of the sender-trunk-connector circuit, and conductors 1119 to 1125, respectively, of the sender, a circuit is established from ground on the off-normal ground conductor 714, over the normal contacts of relay 808, brush 854 and the No. 2 terminal of its arc, over the lower No. 2 back contact of relay 811, conductor 1124, the No. 4 contacts of relays 1131F and 1100, conductor 424 to the (*) segment of the distributor of printer 460. A circuit is also established from battery through the winding of relay 466, conductor 425 to ground over the No. 3 contacts of relay 1100. Relay 466 upon operating connects the driving motor 461 of the printer to the source 467 of alternating current whereupon the motor operates to rotate the typewheel and to advance the distributor brush 462 over the distributor segments until brush 462 engages the segment to which ground potential has been applied, at which time a circuit is completed from ground over that segment, over brush 462 and ring 463 to battery through the winding of print magnet 464. The armature of magnet 464 carries a stabber which enters a slot in the distributor when the selected character has been positioned for printing thereby arresting the rotation of the printer shaft and pressing the ticket tape against the typewheel to print the selected character, in this case an asterisk. When the stabber enters the slot the contacts shown associated with the magnet 464 are closed whereupon ground is connected over conductors 420 and 421, the Nos. 22 and 21 contacts of relays 1100 and 1131F, to conductors 1120 and 1121. With ground connected to conductor 1121, the circuit of relay 808 is completed and relay 808 operates, locking over its lower contacts to ground connected to conductor 1120; establishing a circuit for stepping magnet 857 which may be traced from ground on conductor 1120 over the lower contacts of relay 808, over the lower No. 3 contacts of relay 807, the No. 2 terminal of the arc of switch 850 with which brush 852 is engaged, over the interrupter contacts and through the winding of magnet 857 to battery; and opening at its upper contacts the previously traced circuit of print magnet 464. Magnet 464 thereupon releases and when the stabber is entirely removed from the slot the locking circuit of relay 808 is opened and relay 808 releases in turn releasing magnet 857 to advance the brushes 852, 854 and 856 of switch 850 to the No. 3 terminals of their arcs. Magnet 464 upon releasing also permits the motor 461 to again rotate the typewheel and brush arm 462 of the printer. When the brush 854 engages with the No. 3 terminal of its arc the ticket printer is controlled in the manner just described to print a second asterisk on the ticket whereupon brushes 852, 854 and 856 of switch 850 are again advanced to the No. 4 terminals of their arcs.

*Printing the calling office code*

It will be assumed that the office in which the calling line is located is designated as AUDobon and that in response to the identification of the calling office a relay 909 is operated to register the office designation. The sender now proceeds to control the ticket printer to print the three office code digits of the directory number of the calling line. For this purpose contacts of the register relay 909 are cross-connected to the terminals disclosed in the lower left portion of Fig. 10 whose digit values correspond to the code letters of the calling office designation, or connected to the Nos. 2, 8 and 3 terminals of Fig. 10.

When brush 854 engages the No. 4 terminal of its arc a circuit is established from ground applied thereover over the normal contacts of magnet 857, the upper No. 3 back contact of relay 812, the upper No. 3 back contact of relay 811, conductor 813 of cable 821, the lower contacts of register relay 909, terminal 910 strapped to the No. 2 terminal of Fig. 10, conductor 1112, over the No. 7 contacts of relays 1131F and 1100 and conductor 412 to the No. 2 distributor segment of the printer. In the manner previously described, the rotation of the printer typewheel is arrested by the operation of print magnet 464 when the brush 462 engages the No. 2 segment, the numeral 2 is printed on the ticket and switch 850 of the sender is controlled to advance its brushes 852, 854 and 856 to the No. 5 terminals of their arcs.

With brush 854 engaged with the No. 5 terminal of its arc, a circuit is established from ground thereover, over the upper No. 2 back contact of relay 812, the upper No. 2 back contact of relay 811, conductor 814 of cable 821, over the inner lower front contact of register relay 909, terminal 911 strapped to the No. 8 terminal of Fig. 10, conductor 1118, the No. 13 contacts of relays 1131F and 1100 and conductor 418 to the No. 8 distributor segment of the printer. In the manner previously described the rotation of the printer typewheel is arrested by the operation of print magnet 464 when the brush 462 engages the No. 8 segment, the numeral 8 is printed on the ticket and the switch 850 of the sender is controlled to advance its brushes 852, 854 and 856 to the No. 6 terminals of their arcs.

With brush 854 engaged with the No. 6 terminal of its arc, a circuit is established from ground thereover, over the upper No. 1 back contact of relay 812, the upper No. 1 back contact of relay 811, conductor 815 of cable 821, the upper contacts of register relay 909, terminal 912 strapped to the No. 3 terminal of Fig. 10, conductor 1113, the No. 8 contacts of relays 1131F and 1100 and conductor 813 to the No. 3 distributor segment of the printer. In the manner previously described, the rotation of the printer typewheel is arrested by the operation of print magnet 464 when brush 462 engages the No. 3 segment, the numeral 3 is printed on the ticket and switch 850 of the sender is controlled to advance its brushes 852, 854 and 856 to the No. 7 terminals of their arcs.

When brush 854 engaged with the No. 7 terminal of its arc, a circuit is established from ground thereover over the lower No. 3 back contact of relay 811, conductor 1123, the No. 5 contacts of relays 1131F and 1100 and conductor 423 to the (—) distributor segment of the printer. In the manner previously described, the rotation of the printer typewheel is arrested by the operation of the print magnet 464 when the brush 462 engages the (—) segment, a dash is printed on the ticket and switch 850 of the sender is controlled to advance its brushes 852, 854 and 856 into engagement with the No. 8 terminals of their arcs.

*Printing the calling line number*

It will be assumed that the calling line number is 9095 and that consequently with brush 854 engaged with the No. 8 terminal of its arc, a circuit is established from ground thereover, over the upper No. 3 back contact of relay 822, conductor 816 of cable 821, the upper contacts of relay 923 and the inner lower contacts of relay 925 of the thousands digit register 920, the No. 9' terminal strapped to the No. 9' terminal of Fig. 10, conductor 1119, the No. 14 contacts of relays 1131F and 1100 and conductor 419 to the No. 9 distributor segment of the printer. In a manner previously described, the rotation of the printer typewheel is arrested by the operation of print magnet 464 when the brush 462 engages the No. 9 segment, the numeral 9 is printed on the ticket and switch 850 of the sender is controlled to advance its brushes 852, 854 and 856 to the No. 9 terminals of their arcs. In a similar manner the printer is controlled to print the hundreds digit 0, the tens digit 9 and the units digit 5 as the brush 854 engages the Nos. 9, 10 and 11 position terminals of its arc and applies ground successively over the upper No. 2 and No. 1 and lower No. 1 back contacts of relay 822 and over conductors 817, 818 and 819 of cable 821 extending to the hundreds, tens and units digit registers similar to the thousands digit register 920 and represented by the box 950 of Fig. 9. Following the printing of the units digit of the calling line number the brushes 852, 854 and 856 of switch 850 of the sender are advanced into engagement with the No. 12 terminals of their arcs. With brush 854 engaged with the No. 12 terminal of its arc, ground is connected thereover to conductor 1123 and thence as traced to the (—) distributor segment of the printer, whereupon a dash is printed upon the ticket and switch 850 is controlled to advance its brushes 852, 854 and 856 into engagement with No. 13 terminals of their arcs.

*Printing the month, day and hour*

With brush 854 engaged with the No. 13 terminal of its arc, ground is connected thereover and over a conductor of cable 823 to cause the association of an idle month, day and hour circuit with the sender. It will be assumed that the day and hour circuit fully disclosed in the application of J. W. Gooderham Serial No. 448,782, hereinbefore referred to, has been set to record the month, day and time as December 25, 9:36 and that upon the seizure of such circuit, switch 850 is controlled over branches of conductors 1120 and 1121 to advance its brushes 852, 854 and 856 into engagement with the No. 14 terminals of their arcs. With brush 854 in engagement with the No. 14 terminal of its arc, a circuit is established from ground thereover and a conductor of cable 823 to control the month, day and hour circuit to cause the printer 460 to print the tens digit of the month, in the case assumed the digit 1. Thereafter the brushes 852, 854 and 856 are advanced over the Nos. 15 to 20 terminals of their arcs and control circuits are established over other conductors of cable 823 to control the printer 460 to print the units digit 2 of the month designation, the digits 2 and 5 of the day of the month, the tens digit 0 and the units digit 9 of the hour of the day and the digit 6 designating the six-tenths of an hour or the thirty-sixth minute. Following the control of the printer to print the last digit of the time of day the brushes 852, 854 and 856 are advanced into engagement with the No. 21 terminals of their arcs. A circuit is now established over brush 854 and a conductor of cable 823, which is instrumental in releasing the month, day and hour circuit from its association with the sender, whereupon the brushes 852, 854 and 856 of the switch 850 are advanced into engagement with the No. 22 terminals of their arcs and the printer is controlled over conductor 1123 to print a dash on the ticket. These operations are all carried forward in the manner fully disclosed in the Gooderham application Serial No. 448,782, hereinbefore referred to. Following the printing of the dash on the ticket, the switch 850 of the sender is controlled to advance its brushes 851, 853 and 855 into engagement with the No. 1 terminals of their arcs.

*Printing the sender and identifier numbers*

Upon the engagement of brush 853 with the first terminal of its arc, a circuit is established from ground thereover, over conductor 824 to terminal (SD) of Fig. 10 which is cross-connected to one of the digit terminals in accordance with the tens digit of the number of the sender used. It has been assumed that the first sender has been used for the call and may be designated by the number 00. Therefore, the terminal (SD) is cross-connected to the No. 0 terminal which is in turn connected over conductor 1110, the No. 15 contacts of relays 1131F and 1100 and conductor 410 to the No. 0 distributor-segment of the printer. In the manner previously described the tens digit 0 of the sender number is printed on the ticket and the switch 850 of the sender is controlled to advance its brushes 851, 853 and 855 into engagement with the No. 2 terminals of their arcs. With brush 853 engaged with the No. 2 terminal of its arc, a circuit is now established from ground thereover, over conductor 825 to terminal (SD₁) of Fig. 10 which is cross-connected to the No. 0 terminal in turn connected with the No. 0 distributor segment of the printer. In the manner previously described the units digit 0 of the sender number is printed on the ticket and the switch 850 of the sender is controlled to advance its brushes 851, 853 and 855 into engagement with the No. 3 terminals of their arcs.

With brush 853 engaged with the No. 3 terminal of its arc, a circuit is now established from ground thereover, over conductor 826 and contacts of a relay (not shown) of the sender and allocated to the identifier seized for the call, to the terminal (ID) in the lower portion of Fig. 10. Under the assumption that the first or the No. 0 identifier has been used, the terminal (ID) allocated to such identifier is strapped to the No. 0 terminal connected as previously described to the No. 0 distributor segment of the printer whereby the numeral 0 is printed on the ticket and the switch 850 of the sender is controlled to advance its brushes 851, 853 and 855 to the No. 4 terminals of their arcs. When the brush 853 engages the No. 4 terminal of its arc, ground is applied thereover to conductor 1123 whereby the printer is controlled to print a dash on the ticket after which the brushes 851, 853 and 855 are advanced to the No. 5 terminals of their arcs.

*Printing the called office code*

As the brush 853 is advanced over the Nos. 5, 6 and 7 terminals of its arc, control circuits are established over conductors of cable 827 to the A, B and C code digit registers of the sender to which the code digits of the called line number dialed by the calling subscriber have been transferred from the identifier and in accordance with which registrations the printer 460 is controlled to print these office code digits on the ticket. Since it has been assumed that the calling subscriber dials the office letters M, A, R, the printer is therefore controlled to print the digits 6, 2 and 7. Following the printing of the last office code digit 7, which occurs when brush 853 of switch 850 is in engagement with the No. 7 terminal of its arc, switch 850 is controlled to advance its brushes 851, 853 and 855 into engagement with the No. 8 terminals of their arcs.

*Cutting off the ticket printed for the previous call*

With brush 853 engaged with the No. 8 terminal of its arc, a circuit is completed from ground thereover, over conductor 1122, the No. 16 contacts of relays 1131F and 1100 and conductor 422 to battery through the winding of cut magnet 465 of the printer. Magnet 465 upon operating cuts off the tape just ahead of the first notation of the incident call whereby the ticket made for the previous call is detached for dispatch to the business office, and ground is connected to conductors 420 and 421 and thence as traced to conductors 1120 and 1121 for controlling switch 850 of the sender to engage its brushes 851, 853 and 855 with the No. 9 terminals of their arcs and to release the cut magnet 465 of the printer. With brush 853 engaged with the No. 9 terminal of its arc, a circuit is established from ground thereover, over conductor 1123 and thence as traced to the (—) distributor segment whereupon the printer is controlled to print a dash on the ticket and the switch 850 of the sender is controlled to advance its brushes 851, 853 and 855 into engagement with the No. 10 terminals of their arcs.

*Printing the called line number*

As the brush 853 is advanced over the Nos. 10 to 13 terminals of its arc, control circuits are established over conductors of cable 827 to the thousands, hundreds, tens and units registers of the sender in which the numerical digits of the called line dialed by the calling subscriber have been registered and in accordance with which registrations the printer 460 is controlled to print these digits on the ticket. Since it has been assumed that the calling subscriber dialed the numerical digits 1, 3, 4 and 5 the printer is therefore controlled to print such digits following which switch 850 of the sender is controlled to advance its brushes 851, 853 and 855 into engagement with the No. 14 terminals of their arcs. When the brush 853 engages the No. 14 terminal of its arc, and assuming that the no sender delay relay 828 has been operated from the identifier, a circuit is established from ground over brush 853, over the upper contacts of the end of dialing relay 803, contacts of no sender delay relay 828, conductor 1123 and thence as traced to the (—) distributor segment of the printer. In the manner previously described a dash is printed on the ticket and the switch 850 of the sender is controlled to advance its brushes 851, 853 and 855 into engagement with the No. 15 terminals of their arcs. Upon engaging the No. 15 terminal of its arc, brush 853 connects ground directly to conductor 1123 whereupon an additional dash is printed on the ticket and the brushes 851, 853 and 855 are advanced into engagement with the No. 16 terminals of their arcs.

*Printing the class of the calling line*

It will be assumed that the calling subscriber is entitled to local class service and that therefore local class register relay 725 has been operated. Since the ticket printer is not arranged to print letters the class registration must be printed as an identifying numeral on the ticket. It will be assumed that for the local class the numeral 5 must be printed, for the extended class the numeral 9 must be printed and for the foreign exchange class the numeral 3 must be printed and that for this purpose the terminal (LC) of Fig. 10 connected over conductor 738 to the lower front contact of local class register relay 725 is strapped to terminal 5; that the terminal (EX) of Fig. 10 connected over conductor 739 to the lower front contact of extended service register relay 726 is strapped to terminal 9 and that the terminal (FE) of Fig. 10, connected over conductor 740 to the lower front contact of foreign exchange register relay 727 is strapped to terminal 3. Since it has been assumed that register relay 725 has been operated, then when brush 853 engages the No. 16 terminal of its arc, a circuit is completed from ground applied thereover, over the lower No. 3 back contact of relay 822, conductor 829, the lower contacts of relay 725, conductor 738, terminal (LC) of Fig. 10 strapped to the No. 5 terminal, conductor 1115 and thence to the No. 5 distributor segment of the printer. In the manner previously described the numeral 5 is printed on the ticket and switch 850 of the sender is controlled to advance its brushes 851, 853 and 855 into engagement with the No. 17 terminals of their arcs.

*Printing the charge rate*

It will be assumed that a charge rate register, similar to the register 920 of Fig. 9, has been set from the identifier to register the rate at which the call should be charged. When, therefore, brush 853 engages the No. 17 terminal of its arc, a circuit is established from ground thereover, over the lower No. 2 back contact of relay 822, conductor 820 of cable 821, over contacts of relays of the charge rate register and thence to a terminal strapped to one of the terminals shown in the upper portion of Fig. 10. It will be assumed that ground is thus connected to the No. 2 terminal and thus over conductor 1112 and to the No. 2 distributor segment of the printer. In the manner previously described the numeral 2 is printed on the ticket and switch 850 of the sender is controlled to advance its brushes 851, 853 and 855 into engagement with the No. 8 terminals of their arcs.

It will be recalled that when the party test was made by the sender, relay 716 was operated to register the fact that the calling subscriber was a tip party on a two-party line and relay 716 caused the operation of relay 718. With relay 718 operated, when brush 853 engages the No. 18 terminal of its arc, a circuit is established from ground thereover, over conductor 831, the lower front contact of relay 718, the inner upper front contact of relay 736, the upper No. 2 back contact of relay 733, conductor 127, the No. 19 contacts of relays 1131F and 1100 and conductor 427 through the upper winding of relay 208 to battery. Relay 208 thereupon operates and locks from battery through resistance 241, through its lower winding and lower No. 1 contacts, conductor 242, the upper No. 4 back contact of relay 303, to ground at the upper No. 5 front contact of relay 305 and also locks from battery through its upper winding and over its upper No. 6 contacts, over the lower No. 1 contacts of relay 210 and conductor 237 to ground over the upper contacts of relay 300. On "don't-answer" calls relay 208 releases upon the release of relay 300 but on "answer" calls relay 208 remains operated. Relay 208 upon operating opens at its upper No. 3 back contact the previously traced circuit for relay 1100 of the sender-trunk-connector circuit, whereupon relay 1100 releases and in turn releases relay 736 in the sender. With relay 736 released and relay 718 operated, a circuit is established from ground over brush 853 of switch 850 and the No. 18 terminal of its arc, conductor 831, the lower front contact of relay 718, the inner upper back contact of relay 736, over the lower No. 2 front contacts of relays 716 and 717, one of which was operated on the party test and the other of which was operated on a test of the adjustment of the party test relay 615, over the upper No. 1 back contact of trouble relay 743 to battery through the winding of sender release relay 704. Relay 704 thereupon operates, locks over its lower front contact to ground on conductor 713 and at its upper back contact opens the circuit of off-normal relay 705 which thereupon releases and removes ground from off-normal ground conductors 706 and 710, inclusive. Relay 704 also releases relay 703 which in turn disconnects off-normal ground from conductors 712, 713 and 714. All operated relays of the sender are thereupon released and holding ground is removed by the release of relay 703 from conductor 510 to initiate the release of the trunk finder 500. Relay 703 upon releasing also releases relay 704.

Relay 807 upon releasing establishes a circuit from ground over its lower No. 3 back contact, over the strapped terminals of the arcs of switch 850 associated with brushes 851 and 852, over the interrupter contacts and through the winding of stepping magnet 857 whereby the magnet is intermittently operated to advance the brushes of switch 850 to their normal positions. Relay 807 also releases relay 630 which in turn releases the lock-out relay 1130F of the sender-trunk-connector circuit which in turn releases the multicontact relay 1131F thereby restoring the sender-trunk-connector circuit to its normal condition.

When ground is removed at the sender from conductor 510, relay 520 of trunk finder 500 releases whereupon the circuit of release magnet 517 is established from battery, over the lower contacts of off-normal switch 516, the inner lower back contacts of relay 514, the upper No. 3 contacts of relay 520, the upper back contact of relay 509 to ground over the upper contacts of off-normal switch 516. When the trunk finder is restored to normal, the contacts of switch 516 open thereby releasing the release magnet 517. When the switch is restored to normal relay 508 releases and the previously traced circuit of relay 215 of the trunk is opened and relay 215 releases.

At the end of the conversation, when the calling subscriber restores his receiver to the switchhook, relay 319 of the trunk circuit releases in turn releasing relay 300. If it be assumed that the call was not originated by a tip party substation on a two-party flat rate line, the tip party relay 208 will not be operated and therefore the release of relay 300 will remove holding ground from the sleeve conductor 202 of the trunk applied over its lower front contact, thereby initiating the release of the selector switches which were operated to connect the calling line with the trunk. Relay 300, upon releasing, will also establish a circuit for relay 303 which may be traced from battery through its upper winding over the lower No. 5 contacts of relay 305, conductor 341, the lower No. 2 back contact of relay 215, the lower No. 4 back contact of relay 208, conductor 243 to ground over the upper back contact of relay 300. Relay 303 upon operating extends its operating ground over its upper No. 2 contacts, over conductor 311 to battery through the winding of relay 214, whereupon relay 214 operates and reconnects ground over its lower No. 3 front contact to the trunk sleeve conductor 202 to mark the trunk busy to all selector switches. Relay 214 is made slow to operate so as to provide sufficient time for the release of the selectors towards the calling line. Relays 214 and 303 will remain operated until the completion of the printing of the elapsed conversation time on the toll ticket.

If the call had been from a tip party substation on a two-party flat rate line and relay 208 had therefore been operated as assumed, then upon the release of relay 300 as just described and the removal of ground from the sleeve conductor 202 of the trunk, the selectors toward the calling line would not be released since a substitute ground would be connected to the sleeve conductor over the upper No. 2 contacts of relay 208 and conductor 244 to ground at the lower No. 2 back contacts of relay 303. With relay 208 operated, when relay 300 releases, a circuit is established from ground over the upper back contact of relay 300, conductor 243, the lower No. 4 front contact of relay 208, over the lower No. 3 back contact of relay 215 to trunk finder start conductor 216 and to battery through the winding of group relay 501L allocated to the subgroup of ten trunks in which the calling trunk is located. In the manner previously described, an idle trunk finder, for example, trunk finder 500, is started to hunt for the trunk. When the trunk is found relay 215 is operated over a circuit from ground applied to conductor 217 over brush 518 of the trunk finder, thence over the upper No. 1 contacts of relay 208, conductor 245, the lower normal contacts of relay 300, conductor 247, over the upper No. 2 back contact of relay 214 to battery through the winding of relay 215. Relay 215 thereupon operates to open the start circuit and locks over its upper No. 1 contacts to ground on conductor 217.

When the sender becomes associated with the trunk over brushes of the trunk finder 500, relays 1000, 1008, 1015, 1016, 703 and 705 of the sender operate in the manner previously described and with relay 208 operated, a circuit is established from battery through resistance 248, over the upper No. 4 front contact of relay 208, conductor 246, through the winding of sender-trunk-connector relay 1100, conductor 222, brush 524 of trunk finder 500, the lower No. 3 contacts of relay 520, conductor 530, over the lower No. 2 back contacts of relay 605, through both windings of polarized relay 611, over the upper No. 3 back contact of relay 605, through resistance 644 and over the upper No. 2 back contact of relay 605 to ground applied to off-normal ground conductor 708 by the operation of off-normal relay 705. Relay 611 thereupon recognizes the call as a second seizure for making a false ground test on the calling line and establishes the circuit of relay 645 rather than the circuit of relay 613. The circuit of relay 645 may be traced from battery, through its winding, over the upper contacts of relay 611 to ground on off-normal ground conductor 709. Relay 645 upon operating locks over its lower No. 1 contacts to ground on conductor 709; establishes the operating circuit for relay 639 which extends from battery through its winding, over the upper No. 1 contacts of relay 645 and conductor 646 to ground at the lower back contact of release relay 704; and supplies a weaker adjustment for party test relay 615 by biasing its upper winding over a circuit from battery 618 through resistance 614 and such winding, and over the lower No. 2 contacts of relay 645 to ground through resistance 647, which resistance is higher than the direct ground used for the original party identification test applied over the upper No. 2 contacts of relay 613. Relay 615 under this condition will operate on any condition which caused relay 615 of the same or another sender to operate on the original test. With relay 639 operated a circuit is established from battery through the winding of the end of pulsing relay 731, over conductor 744, the upper No. 2 contacts of relay 639, conductor 532, the lower No. 5 contacts of relay 520, brush 526, conductor 224, the lower No. 2 back contact of relay 209 to ground over the lower No. 2 contacts of relay 208. Relay 731 thereupon operates.

Relay 608 operates over a circuit through its winding over the lower No. 1 normal contacts of relay 605 to ground on off-normal conductor 708 following the operation of off-normal relay 705 and in turn causes the operation of relays 609, 606 and 600 in the manner previously described. Relay 645 upon operating establishes the circuit of relay 605 which may be traced from battery through its winding and over its upper No. 1 normal contacts, over the upper No. 4 contacts of relay 645, over the upper front contact of relay 608, over the upper and lower No. 3 contacts of relay 600 and through resistance 621 to ground. Relay 605 thereupon operates, locks over its upper No. 1 alternate contacts to ground on off-normal ground conductor 708, and opens the circuit of relay 608, if relay 731 has operated, whereupon relay 608 releases followed by the release of relay 609. Relay 600 does not release, however, since when it operated it locked over its lower No. 2 contacts to ground over the inner upper normal contacts of relay 610. Relay 609 upon releasing initiates the release of timing relay 606. When relays 608 and 609 released and with relay 600 operated, the lower winding of party test relay 615 is presented to the tip and ring conductors of the calling line until timing relay 606 finally releases after a .05 second interval. The circuit over which the lower winding of relay 615 is connected to the tip conductor 189 of the calling line may be traced from battery 618 through such winding, over the upper No. 3 back contact of relay 619, through rectifier 620, over the upper back contact of relay 609, the lower back contact of relay 608, the upper No. 1 alternate contacts of relay 600, the upper No. 2 back contact of relay 601, conductor 527, the upper No. 5 contacts of relay 520 and brush 521 of trunk finder 500, conductor 219, the lower No. 3 contacts of relay 208 of the trunk, the upper No. 3 back contact of relay 209, the upper No. 6 back contact of relay 210, which released upon the release of relay 300, tip trunk conductor 200 and thence over the established connection to the tip conductor 189 of the line. The lower winding of relay 615 is connected to the ring conductor 188 of the calling line from battery 618, through such winding, over the upper No. 3 back contact of relay 619, through rectifier 620, over the upper back contact of relay 609, the lower No. 1 alternate contacts of relay 600, the lower No. 3 back contact of relay 601, conductor 528, the upper No. 4 contacts of relay 520 and brush 522 of trunk finder 500, conductor 220, the lower No. 5 back contact of relay 210, the upper No. 5 front contact of relay 208, the upper No. 4 back contact of relay 209, the lower No. 2 back contact of relay 210, ring trunk conductor 201 and thence over the established connection to the ring conductor 188 of the calling line.

If the ground has been removed from the subscriber's line as it should have been when the calling subscriber restored his receiver to the switchhook, relay 615 will not operate thereby resulting in the operation of relays 623, 619 and 717 as previously described. When relay 717 operates a circuit is established from ground over its upper No. 1 contacts, the lower No. 2 back contact of relay 736, the lower No. 1 front contact of relay 734, conductor 745, over the lower No. 2 contacts of relay 639, conductor 531, the lower No. 4 contacts of relay 520 and brush 525 of trunk finder 500, conductor 223, over the upper No. 2 back contact of relay 209 to a point between the lower winding of relay 208 and resistance 241, whereupon relay 208 is shunted down and releases and opens the previously traced circuit of relay 734. Relay 731 now releases and establishes a circuit from ground over the upper No. 1 contacts of relay 717, over the lower No. 2 back contact of relay 736, the lower No. 1 back contact of relay 731, conductor 746, the upper No. 1 contacts of relay 639, conductor 648, the upper No. 1 back contact of relay 743 to battery through the winding of release relay 704. The sender and trunk finder thereupon proceed to release in the manner previously described.

*False ground condition*

If, however, relay 615 should operate when its lower winding is presented to the calling line, indicating a false ground condition on the calling line which would render the previously made party test unreliable, and should remain operated for a predetermined interval, then with relay 639 operated, there is no circuit effective for operating relay 624 and therefore relays 608 and 609 will remain released and relay 600 will remain operated to keep the lower winding of test relay 615 presented to the calling line.

When the sender was first seized to initiate the false ground test of the calling line and relay 705 operated, a circuit was established from battery through the winding of relay 905 of the timing circuit, over conductor 918, the lower No. 2 back contact of relay 805, conductor 919, over the normally closed contacts associated with cam 916 of the timer, conductor 926, over the lower No. 3 back contact of relay 833, the lower No. 1 back contact of relay 800, conductor 830, over the lower No. 2 front contact of relay 705 to ground. Relay 905 upon operating, locked over its upper No. 1 contacts, conductor 927, the upper No. 1 back contact of relay 805, over the lower No. 3 back contact of relay 833, over the lower No. 1 back contact of relay 800 to ground on conductor 830 and at its upper No. 2 contacts established the circuit of motor 917 of the interrupter. After the elapse of approximately ten seconds, a circuit is established from battery through the winding of relay 902, conductor 937, the lower No. 3 contacts of relay 645, conductor 938 to ground over the contacts controlled by timing cam 915. With relay 639 operated a circuit is now effective from ground on conductor 710, over the upper contacts of relay 902, conductor 928, the lower No. 1 contacts of relay 639 to battery through the upper winding of relay 649. Relay 649 upon operating, locks through its lower winding and over its lower No. 1 contacts to ground on off-normal ground conductors 712; establishes a circuit from ground on conductor 712 over its upper No. 3 contacts and conductor 650 through the winding of relay 805 to battery; establishes a circuit from ground over its upper No. 1 contacts and conductor 651 to battery through the winding of relay 811 and connects ground over its upper No. 2 contacts to conductor 652 which is later extended to an alarm circuit in the trunk. Relay 805 upon operating releases the operated relays of the timing circuit to normal and causes the operation of a sender-trunk-connector circuit in the manner previously described. It will be assumed that the sender-trunk-connector of Fig. 11 is operated, thereby extending the control conductors from the sender to the trunk and to the ticket printer thereof. The circuit previously established to conductor 652 is now extended over the No. 20 contacts of relays 1134F and 1100 of the connector circuit and conductor 408 to battery through the upper winding of alarm relay 409 of the trunk. Relay 409 thereupon operates and locks over its inner upper contacts to ground over the normal contacts of alarm release key 428, closing the circuit of alarm lamp 429 and over its lower contacts closing an audible alarm circuit.

Following the operation of the sender-trunk-connector, relay 736 of the sender is operated and the start circuit for advancing switch 850 from its normal position is established as previously described. With relay 811 now operated, when brush 854 reaches the No. 1 terminal of its arc, a circuit is established from ground applied over conductor 714, over the normal contacts of stepping relay 808, brush 854 and the No. 1 terminal of its arc, the lower No. 2 front contact of relay 811, conductor 1123, and thence as previously traced to (−) distributer segment of the printer 460 of the trunk. When the brush 462 of the printer, which with the type wheel of the printer was started into operation by the closure of the motor circuit by the operation of relay 466 following the operation of relay 1109 of the sender trunk connector, reaches the (−) segment, print magnet 464 is operated to arrest the rotation of the type wheel to print a dash on the ticket and to control the advance of the brushes 852, 854 and 856 of switch 850 of the sender into engagement with the No. 2 terminals of their arcs in the manner previously described. With brush 854 engaged with the No. 2 terminal of its arc, a circuit is established from ground thereover, over the lower No. 1 front contact of relay 811, thence as previously traced to the (−) distributor segment of the printer, whereupon a second dash is printed on the ticket and the switch 850 is controlled to advance its brushes 852, 854 and 856 into engagement with the No. 3 terminals of their arcs.

With brush 854 in engagement with the No. 3 terminal of its arc, a circuit is established from ground applied thereover, over the upper No. 3 back contact of relay 812, the upper No. 3 front contact of relay 811, conductor 824, terminal (SD) strapped to a terminal in the lower portion of Fig. 10 indicative of the tens digit of the sender number, for example, to the No. 0 terminal, and thence as previously traced to the No. 0 distributor segment of the printer. In the manner previously described, when distributor brush 462 engages the No. 0 segment, print magnet 464 is operated to arrest the rotation of the type wheel, to print the digit 0 on the ticket and to control the advance of the brushes 852, 854 and 856 of the switch 850 into engagement with the No. 4 terminals of their arcs. With brush 854 in engagement with the No. 4 terminal of its arc, a circuit is established from ground applied thereover, over the upper No. 2 back contact of relay 812, the upper No. 2 front contact of relay 811, conductor 825, terminal (SD1) strapped to a terminal in the lower portion of Fig. 10 indicative of the units digit of the sender number, for example, to the No. 0 terminal, and thence as previously traced to the No. 0 distributor segment of the printer. In a manner previously described, when the distributor brush 462 engages the No. 0 segment, print magnet 464 is operated to arrest the rotation of the type wheel, to print the digit 0 on the ticket and to control the advance of the brushes 852, 854 and 856 of the switch 850 into engagement with the No. 5 terminals of their arcs.

When brush 854 engages the No. 5 terminal of its arc, a circuit is established from ground applied thereover, over the upper No. 1 back contact of relay 812, the upper No. 1 front contact of relay 811, conductor 1123, and thence as traced to the (-) distributor segment of the printer. In the manner previously described, upon the distributor brush 462 engaging the (-) segment, print magnet 464 is operated to arrest the rotation of the type wheel, to print a dash on the ticket and to control the advance of brushes 852, 854 and 856 of switch 850 into engagement with the No. 6 terminals of their arcs. With brush 854 engaged with the No. 6 terminal of its arc, a circuit is established from ground applied thereover, over the lower No. 3 front contact of relay 811, conductor 832, the lower No. 1 front contact of relay 731, conductor 745, the lower No. 2 contacts of relay 639, conductor 531, the lower No. 4 contacts of relay 520 of the trunk finder, brush 525, conductor 223, the upper No. 3 back contact of relay 209 to a point between the lower winding of relay 208 and resistance 241 thereby causing the release of relay 208. Relay 208 upon releasing opens the previously traced circuit of relay 731 which releases. With relay 731 released, the circuit of release relay 704 is established from ground, applied over brush 854 and the No. 6 terminal of its arc, over the lower No. 3 front contact of relay 811, conductor 832, the lower No. 1 back contact of relay 731, conductor 746, the upper No. 1 contacts of relay 639, conductor 648 and over the upper No. 1 back contact of relay 743 to battery through the winding of release relay 704. The sender, trunk finder and sender-trunk connector then proceed to release in the manner previously described. The printer has thus been controlled to print the notation "-- sender number -" on the ticket indicative of the false ground condition, or in the case assumed "--00-".

*Printing the elapsed time*

With relay 208 released following the false ground test, the circuit of relay 303 is established to start the ticket printer to print the elapsed time digits on the ticket. This circuit may be traced from battery through the upper winding of relay 303, over the lower No. 6 contacts of relay 305, conductor 341, the lower No. 2 back contact of relay 215, the lower No. 4 back contact of relay 208, conductor 243, to ground over the upper back contact of relay 300. With relay 303 operated in the manner described, if the call was not for a tip party, it opens the locking circuit for relay 330 at its upper No. 3 back contact allowing relay 330 to release; closes a circuit from ground over its lower No. 2 front contact and conductor 342 to battery through the winding of relay 466 to start the printer driving motor 461, and closes a circuit from battery through the winding of relay 406, over conductor 407, over the lower No. 1 back contact of relay 322, the lower No. 3 back contact of relay 330, the upper No. 4 front contact of relay 303, to ground at the upper No. 5 contacts of relay 305. Relay 406 prepares a circuit for print magnet 464 which is completed when the distributor brush 462 reaches the (-) segment of the distributor. This circuit may be traced from battery through the magnet 464, the (-) segment, brush 462, conductor 430, the No. 1 terminal of the arc of register 350 associated with brush 352, the normal contacts of pulse-help relay 310, conductor 343, and to ground over the upper No. 4 contacts of relay 406. Magnet 464 upon operating arrests the rotation of the type wheel, prints a dash on the ticket and establishes a circuit from ground over its contacts, over conductor 431, the lower No. 4 contacts of relay 303 to battery through the winding of pulse-help relay 310. Relay 310 operates; locks over its inner lower contacts and conductor 432 to ground over contacts of magnet 464; opens at its normal contacts the previously traced circuit for print magnet 464 which thereupon releases and closes a circuit for stepping magnet 353 of register 350 which may be traced from battery through the winding of magnet 353, over the upper contacts of relay 310 to ground over the upper No. 5 contacts of relay 305. Magnet 464 upon releasing releases relay 310 which in turn releases magnet 353 whereby the brushes 351 and 352 of register 350 are advanced into engagement with the No. 2 terminals of their arcs.

With brush 352 on the No. 2 terminal of its arc, ground applied thereto over the normal contacts of relay 310 as previously traced, is applied over the upper No. 1 contacts of relay 303, and conductor 314 to the lower movable spring of off-normal switch 405 associated with the tens timing register 400. If this register has not been advanced due to the call having been less than ten minutes in duration, the circuit is extended over the lower No. 1 front contact of relay 406 and the upper No. 2 front contact of relay 406, to brushes 455 and 456 of the units timing register 450. If this register has not advanced its brush 455 beyond the first two terminals of its arc, indicating a maximum duration of conversation of not more than 15 to 30 seconds, this circuit is further extended over the lower No. 2 contacts of relay 406 and conductor 433 to the (*) segment of the distributor of the printer. When thereafter the brush 462 engages this segment, print magnet 464 is operated to arrest the rotation of the type wheel, to print an asterisk on the ticket and to cause the advance of the brushes of register 350 a further step in the manner previously described.

If, however, the units timing register 450 has advanced beyond the Nos. 1 and 2 terminals of the arc associated with brush 455, the previously traced circuit is extended over either brush 455 or brush 456 and a terminal of the associated arc to either conductor 434 or 435 and thence over the upper No. 1 or the upper No. 3 front contacts of relay 406 to the No. 0 distributor segment. In the manner previously described, when the brush 462 engages this segment, magnet 464 operates to arrest the rotation of the type wheel, to print the number 0 on the ticket indicative of the fact that the conversation lasted less than ten minutes and to cause the advance of the brushes of register 350.

It will be assumed, however, that the conversation lasted 16 minutes and that therefore the brushes 401 and 402 have been advanced to the No. 1 terminals of their arcs and the off-normal switch 405 has been operated to its alternate position. Therefore the circuit previously traced to the lower movable spring of the off-normal switch 405 is extended over brush 401 and the No. 1 terminal of its arc to the No. 1 distributor segment and, when the brush 462 engages such segment, print magnet 464 is operated to arrest the rotation of the type wheel, to print the tens digit 1 of the elapsed time on the ticket and to control the advance of the brush 352 of register 350 into engagement with the No. 3 terminal of its arc as previously described.

A circuit is now established from ground applied over the normal contacts of relay 310 to brush 352, thence over the No. 3 terminal of its arc, conductor 436, brush 454, which is in engagement with one of the first four terminals of its arc to indicate that the conversation terminated some time during the sixth minute of a ten minute period, to the No. 6 distributor segment. When the brush 462 engages such segment, print magnet 464 is operated to arrest the rotation of the type wheel, to print the units digit 6 of the elapsed time on the ticket and to cause the advance of brush 352 of register 350 into engagement with the No. 4 terminal of its arc as previously described.

A circuit is now established from ground applied over the normal contacts of relay 310 to brush 352, thence over the No. 4 terminal of its arc and conductor 433 to the (*) segment of the distributor of the printer, whereupon the magnet 464 is operated to arrest the rotation of the type wheel, to print an asterisk on the ticket and to cause the advance of brush 352 of register 350 to the No. 5 terminal of its arc. With brush 352 engaging the No. 5 terminal of its arc, the circuit just traced is completed to cause a second asterisk to be printed on the ticket and to cause the advance of the brush 352 to the No. 6 terminal of its arc.

A circuit is now established from ground applied over the enormal contacts of relay 310 to brush 352, thence over the No. 6 terminal of its arc and conductor 213 to battery through the winding of relay 209. Relay 209 now operates, opening at its upper No. 1 back contact the locking circuit of relay 305 which now releases in turn releasing relay 303. With relay 303 released, the circuit of relay 406 is opened and relay 406 releases. The restoring circuit for the units timing register 450 is now established from battery through the winding and interrupter contacts of the stepping magnet 457 thereof, over the upper No. 5 back contact of relay 406, conductor 437, the lower No. 1 back contact of relay 305, conductor 438, over the strapped terminals associated with brush 451 and thence over brush 451 to ground to advance the brushes 451, 453 and 455 to the No. 22 terminals of their arcs if the register has not been advanced beyond a half revolution. With brush 451 engaging the No. 22 terminal of its arc, an obvious self-interrupting circuit for magnet 457 is established for advancing the brushes of register 450 until brush 452 engages the first terminal of its arc, whereupon magnet 457 is operated over the circuit previously traced to conductor 438 and thence over strapped terminals of the arc associated with brush 452 and over brush 452 to ground until brush 452 engages the No. 17 terminal of its arc. A circuit is now closed from ground over brush 452 and the No. 17 terminal of its arc, conductor 439, the Nos. 3 and 1 lower back contacts of relay 305, conductor 437, the upper No. 5 back contact of relay 406 to battery over the interrupter contacts and through the winding of magnet 457. Magnet 457 now operates over this circuit to advance the brushes of register 450 until the brush 452 engages the No. 19 terminal of its arc whereupon the previously traced circuit for magnet 457 is effective to advance the brushes of register 450 into their normal positions, in which positions no circuit is effective to further operate magnet 457.

With brush 451 now in engagement with the No. 1 terminal of its arc, a circuit is established from ground thereover, over the lower No. 1 back contact of relay 406, over the upper contacts of off-normal switch 405, if register 400 has been advanced from normal, over conductor 440, the lower No. 4 back contact of relay 305 and conductor 441 to battery through the winding of release magnet 404. Magnet 404 upon operating causes the restoration of brushes 401 and 402 of register 400 to their normal positions, whereupon the off-normal switch 405 is restored to release magnet 404. When relay 303 is released, it establishes a circuit from ground over its lower No. 3 back contact, the upper contacts of off-normal switch 355, conductor 308, the upper No. 2 back contact of relay 215, the inner upper back contact of relay 211 and conductor 313 to battery through the winding of release magnet 354 of register 350, whereupon this register is restored to normal. All of the operated apparatus of the trunk has now been restored to normal. The ticket now has printed thereon all of the information required for billing the call. The ticket printed as previously described for the assumed call, would have the following notations: * * 283–9095–1225096–000–627–1345–52–16 * *. If the sender had upon the group test detected an unstandard ground condition, the ticket printed would appear as follows: * * 283–9095–1225096–000–627–1345–52–00–16 * *.

*Call duration over 99 minutes*

When a conversation reaches 99 minutes duration, the tens timing register 400 is advanced to position its brushes 401 and 402 upon the No. 10 terminals of their arcs by the circuit previously traced over the No. 16 terminal of the arc associated with brush 456 of the units register after the units register has made nine complete revolutions. Since the brushes of register 400 are advanced from the No. 9 to the No. 10 terminals of their arcs upon the closure of the circuit of the stepping magnet 403, upon the engagement of brush 456 with the No. 16 terminal of its arc, and register 450 is not advanced a further step until this impulse ceases, register 450 is prevented from advancing beyond the No. 17 terminal position of the arcs associated with brushes 452, 454 and 456. With brush 452 engaging the No. 17 terminal of its arc, a circuit is established from ground thereover, over brush 402 and the No. 10 terminal of its arc, conductor 442, through the lower winding of relay 303 and conductor 443 to battery through the lower winding of alarm relay 409. Relay 409 operates and locks thereby causing lamp 429 to light and closes the alarm circuit and relay 303 upon operating causes the printer motor 461 to operate. The printing of the elapsed time proceeds in the manner previously described, a dash being printed in position 1 of register 350, a tens digit 9 being printed in position 2 of register 350, a dash being printed in position 3 instead of a units digit zero to provide a positive check against printing a nine instead of a zero should the path for advancing register 450 be opened due to a trouble condition when brush 455 reaches the No. 18 terminal of its arc and asterisks being printed when switch 350 is in positions 4 and 5. Thus for a time interval of over 99 minutes, a first notation of 9— * * is printed on the ticket.

When register 350 reaches position 6, a circuit is established for operating relay 209 which releases relay 305 followed by the release of registers 350, 400, and 450. When register 400 becomes restored to normal, relay 303 releases followed by the release of relay 406. The rotation of the printer shaft is now arrested. If the call is not abandoned at this time, the fact that relays 300 and 325 are still operated causes the reoperation of relays 305 and 330 as previously described and the setting of the timing registers 400 and 450 as previously described for the interval over 100 minutes. When the calling subscriber terminates the conversation and restores his receiver to the switchhook, the printing of the elapsed time over 100 minutes is accomplished in the manner previously described.

Non-ticketed call

On a call which is not to be ticketed, relay 733 of the sender and relay 322 of the trunk are both operated from the identifier, the circuit of relay 322 being traced in part from conductor 249 extended to the identifier over contacts of the identifier-trunk-connector, over the upper No. 4 contacts of relay 218 and conductor 250 to battery through the lower winding of relay 322. Relay 322 upon operating, locks through its upper winding and upper No. 1 contacts to ground over the upper No. 5 contacts of relay 305; opens at its lower No. 1 back contact the circuit of relay 406 which controls the printing of the digits designating the duration of the conversation; opens at its lower No. 2 back contact the previously traced circuit controlled by relay 336 for periodically advancing the timing registers 400 and 450; at its upper Nos. 3 and 4 contacts reverses the connection of battery and ground through the windings of the calling supervisory relay 319 so that when the called supervisory relay 325 operates following the response of the called subscriber and in turn operates reversing relay 306 there will be no reversal of current over the calling line loop in order to cause the charge apparatus to function in the message rate or coin trunk; at its lower No. 3 front contact establishes a further locking circuit for itself from battery through its lower winding to ground over the upper front contact of relay 300 and over its upper No. 2 front contact establishes the locking circuit of relay 305 extending through the winding and over the upper No. 1 alternate contacts thereof and over the upper No. 2 front contact of relay 322 to ground at the upper front contact of relay 300.

With relay 733 of the sender operated, the circuit previously traced over the lower No. 3 back contact thereof for advancing the printer control switch 850 of the sender off-normal is not effective and the circuit over either its lower No. 1 or No. 2 back contacts for operating either relay 630 or 632 is not effective to call in a sender-trunk-connector as previously described. Also a circuit is established by the operation of relay 733 from ground on conductor 710, over the lower back contact of relay 903 of the timing circuit, conductor 908, the upper back contact of relay 809, the upper front contact of relay 807, conductor 810, the lower No. 3 front contact of relay 733, the lower front contact of relay 718, if operated in response to a tip party test, the upper back contact of relay 736, or over the back contact of relay 718 on a ring party test, over the lower No. 2 front contacts of relays 716 and 717, one of which will have operated on the party test and the other of which will have operated on the check test of the party test relay 615 as previously described, over conductor 648, and over the upper No. 1 back contact of relay 743 to battery through the winding of the sender release relay 704. Relay 704 therefore operates to release the sender and the trunk finder in the manner previously described.

Denied service

If the attempted call is denied to the calling subscriber and relay 232 is therefore operated from the identifier, it locks over its upper No. 1 contacts and conductor 237 to ground over the upper front contact of relay 300; over its lower No. 2 front contact and conductor 251 a start circuit is established to the "no such number tone circuit" and a circuit is also established from the interrupter circuit 252 over its upper No. 3 contacts to the "no such number tone circuit" whereby such circuit applies an interrupted tone current over conductors 257 and 258 and the upper Nos. 2 and 4 contacts of relay 232 and thence over the calling line loop as a signal that the connection cannot be established. At its back contacts relay 232 opens the dialing and ring conductors toward the sender thereby giving the sender a disconnect signal. The sender then proceeds to release in the manner previously described in turn releasing the trunk finder. The calling subscriber upon hearing the tone restores his receiver to the switchhook thereby releasing the operated selector switches and restoring the trunk to normal.

Failure to identify the calling line

If for any reason the identifier fails to identify the calling line, the sender functions to establish a connection with a monitoring operator's position over a trunk circuit which is common to a group of senders. This arrangement permits the completion of such calls through the ticketing equipment under the control of the monitoring operator so as to prevent overload conditions should the identifier failure be common to a number of subscribers. When the units digit identification of the calling line has been completed by the identifier and the class rate information has been sent to the sender, the sender should have all of the information required from the identifier. A test circuit is then completed through contacts of the register relays of the sender. If this test circuit is not completed, indicating a failure of the identifier to transmit all of the required information to the sender, the identifier connects ground to conductor 839 and causes the operation of trouble release relay 833 of the sender. Relay 833 operates and locks over its own winding, the winding of relay 834, over the inner upper front contact of relay 833 and conductor 714 to ground over contacts of relay 703. Relay 833 upon operating opens at its lower No. 1 back contact a circuit extending from battery through resistance 836, over the lower No. 1 back contact of relay 833, the lower No. 1 normal contacts of relay 805, the upper back contact of relay 837, and the lower back contact of relay 809 to the terminal 838 which is strapped to a terminal in the identifier-connector and over which the identifier-connector was started to associate the sender with the identifier. The identifier-connector is now released and all direct connections between the sender and the identifier are opened and any operated apparatus of the identifier is returned to its normal condition. Relay 833 also establishes a circuit from ground over its lower No. 2 contacts to the identifier-connector to hold a relay of the identifier-connector, allocated to the identifier which gave the trouble release signal, so that the sender will be connected to another identifier on a second trial.

When the identifier-connector released, the circuit over which relay 833 was operated from the identifier is opened whereupon relay 834 now operates over the locking circuit of relay 833 and at its inner lower front contacts recloses the start circuit traced to terminal 838 whereupon the identifier-connector is operated to seize another identifier for a second trial. If the second identifier is successful in handling the call, relays 804 and 805 will be operated in the manner previously described after the identifier has transferred all of the information to the sender and the identifier will be released. If the second identifier is for any reason unable to handle the call, such identifier will connect a trouble ground to conductor 839 and with relay 834 now operated, this ground is extended over the upper contacts of relay 834 to battery through the upper winding of relay 809, whereupon relay 809 operates, locking through its lower winding and over its inner lower front contacts to ground on conductor 714 and opening the start circuit of the identifier-connector at its lower back contact thereby initiating the release of the identifier-connector circuit and identifier. If the trouble which caused the failure was in connection with the reconstruction of the called office code, relay 804 will not have operated and consequently relay 809 upon operating will establish a circuit from ground over its lower front contact and the No. 2 back contact of relay 804 to battery through the winding of relay 805 and the sender will proceed to send an all-paths-busy signal to the trunk as later described. However, if the trouble which caused the trouble release was with the identification of the calling line, relay 804 will have operated and in this case a circuit will be established from ground over the lower front contact of relay 809, over the No. 2 front contact of relay 804, the inner upper front contact of relay 803 to battery through the winding of relay 837, whereupon relay 837 will operate to initiate the establishment of a connection to the sender monitor's position.

Relay 837 upon operating establishes a circuit from battery through resistance 836, over the inner lower front contact of relay 834, the lower No. 1 normal contacts of relay 805, the inner upper front contacts of relay 837, conductor 840, over the upper back contact of relay 1022 to ground through the winding of preference relay 1023F individual to the first of the group of senders to ground. Relay 1023F upon operating establishes a locking circuit for itself over its lower contacts to battery applied as traced to conductor 840, independently of the contacts of relay 1022 and establishes the circuits of relays 1022 and 1024 over its inner upper front contact. Relays 1022 and 1024 upon operating open at their back contacts, the operating circuits for the preference relays of all senders of the group, relay 1023F, however, remaining operated over the locking circuit just traced. With relay 1023F operated, a circuit is established from ground over the middle lower back contact of the preference relays of other senders, over the middle lower front contact of relay 1023F, conductor 1025, the inner upper No. 1 back contact of relay 800, the lower back contact of relay 812 and conductor 1026 to battery through the winding of relay 1027. Relay 1027 operated, establishing a loop circuit over its alternate contacts through resistance 1028 and over the upper back contacts of sleeve relay 1029 to battery and ground through the windings of relay 1030. Relay 1030 thereupon operates establishing an obvious circuit for relay 1031 which operates and establishes the circuit of lamp 1032 associated with jack 1033 at the monitoring operator's position.

When the monitoring operator answers by plugging a cord circuit of her position into the jack 1033, a circuit is established for sleeve relay 1029 which at its lower back contact opens the circuit of lamp 1032 to extinguish it and opens at its upper back contacts the circuit of relay 1030 which thereupon releases followed after an interval by the release of relay 1031. After relay 1031 releases a circuit is established from ground over the front contact of relay 1029, the back contact of relay 1031, over the middle upper back contacts of preference relays such as 1023L and 1023I, allocated to other senders of the group, over the middle upper front contact of relay 1023F and conductor 1034 to battery through the winding of relay 800. Relay 800 thereupon operates; establishes an obvious circuit for relays 812 and 822 in parallel over its lower No. 3 front contact; establishes a holding circuit for relay 1000 extending from battery through its middle winding, through coil 1001, conductor 1002 and over the upper No. 3 and lower No. 5 front contacts of relay 800 and through resistance 841 to ground and at its upper No. 2 and lower No. 4 contacts transfers the connection from the tip and ring conductors extending back to the calling line from the middle winding of relay 1000 and ground to conductors 842 and 843, thence over the normal contacts of relay 1027 and the tip and ring contacts of jack 1033 and the operator's cord plug engaged therein to the operator's headset. The monitoring operator may now talk with the calling subscriber to secure from him the number of his line and the number of the line which he has called, which information the operator writes on a ticket, and to inform such subscriber that the call will be completed.

The sender remains in this condition until the operator disconnects, whereupon relay 1029 releases followed by the release of relay 800. Relays 812 and 822 do not release following the release of relay 800 since when relay 812 operated it locked itself and relay 822 over its lower No. 1 front contact to ground on off-normal conductor 712. A circuit is now established from ground over the lower No. 2 back contact of relay 800 and the lower No. 2 front contact of relay 812 to battery through the winding of relay 805 which now operates, locks, causes the operation of relay 807, permits the continuation of outpulsing to set up the connection to the wanted line, causes the association of the sender with the ticketing trunk over a sender-trunk-connector and at its lower No. 1 contacts opens the circuit of preference relay 1023F which thereupon releases in turn releasing relays 1022 and 1024. Relay 805 also establishes the previously traced circuit for starting switch 850.

Since at this time relays 812 and 822 are operated, the ticket printer will print zeroes for the calling office code, calling line number, class and rate since the sender has not been able to secure the proper calling line identification and class information from the identifier. During the advance of brush 854 of switch 850 over the Nos. 2 and 3 terminals of its arc, two asterisks will be printed on the ticket as previously described and thereafter brush 854 will be advanced into engagement with the No. 4 terminal of its arc. With brush 854 so engaged, a circuit is established from ground thereover, over the upper No. 3 front contact of relay 812 to the No. 0' terminal 844 strapped to the No. 0' terminal of Fig. 10 and thence to the No. 0 distributor segment of printer 460 for controlling the printer to print the digit 0. In the Nos. 5 and 6 positions of the brush 854, similar circuits are established over the upper No. 2 and No. 1 front contacts of relay 812 to the No. 0 segment of the printer distributor whereby two additional zeroes are printed. Thus three zeroes are printed on the ticket in place of the office code digits. In position 7 brush 854 controls the printing of a dash and in the following positions 8, 9, 10 and 11 of brush 854, circuits are established over the upper Nos. 3, 2 and 1, the lower No. 1 front contacts of relay 822 for controlling the printer to print four successive zeroes on the ticket in place of the calling line number digits. From this point as switch 850 advances its brushes from position to position, the printer is controlled to print the digits indicative of the month, the day of the month, the hour of the day and the fraction of the hour of the time when the call was made, to print the sender and identifier numbers and to print the called office code and called line number in the manner previously described. After these printing operations have been completed, switch 850 will have advanced its brush 853 into engagement with the No. 16 terminal of its arc.

With relay 822 operated, when brush 853 engages the No. 16 terminal of its arc a circuit is established from ground thereover, over the lower No. 3 front contact of relay 822 to the No. 0' terminal 844 strapped to the No. 0' terminal of Fig. 10, thence to the No. 0 distributor segment of the printer, whereupon the printer is controlled to print a zero on the ticket in place of the usual class identification digit. Following the printing of this digit when brush 853 engages the No. 17 terminal of its arc, a similar circuit is established over the lower No. 2 front contact of relay 822 for controlling the printer to print another zero on the ticket in place of the usual charge rate digit. The sender-trunk-connector and trunk finder are thereafter released and the ticket printer of the trunk is controlled to print digits on the ticket indicative of the elapsed time of the conversation as soon as the calling subscriber restores his receiver to terminate the conversation, all in the manner previously described. The printed ticket will thus lack the calling line identification, the calling line class identification and the call charge rate, but this information may be supplied from the ticket which the operator has made in accordance with the data which she secured from the calling subscriber.

*Sender monitor busy*

As before stated, the trunk to the sender monitor's position is common to a group of senders. Whenever the trunk is busy and relays 1022 and 1024 are operated through the operation of the preference relay 1023 of the sender which has taken such trunk for use, the circuits of the preference relays of all other senders of the group are opened at the back contacts of relays 1022 and 1024 and the preference relay of no other sender may be operated. Therefore, if any other sender, for example, the sender disclosed, should attempt to seize the trunk, a circuit will be established from ground over the front contact of relay 1022, over the upper back contact of the preference relay 1023F of such sender, conductor 1035, the upper contacts of relay 837 and the lower No. 1 normal contacts of relay 807 to battery through the windings of relays 812 and 822 which thereupon operate and lock. Since relay 800 is not operated under this condition, the circuit of relay 805 is established from ground over the lower No. 2 back contact of relay 800, the lower No. 2 contacts of relay 812 to battery through the winding of relay 805 and relay 805 will be operated to initiate the printing of the ticket as just described.

*All-paths-busy signal to the trunk on identifier failure*

It was previously stated that in the event a second identifier found difficulty in reconstructing the called office code on a second trial, relay 804 of the sender would not be operated but that upon the receipt of the trouble release signal from the second identifier, relay 809 was operated and locked and caused the operation of relay 805. With relay 809 operated and relay 837 not operated, a circuit is established from ground over conductor 908, over the upper front contact of relay 809, the lower back contact of relay 837, conductor 1128, the No. 17 contacts of relays 1121F and 1100 of the trunk-sender-connector circuit of Fig. 11, conductor 444 and conductor 311 to battery through the winding of relay 214 of the trunk. Relay 214 then operates and proceeds to transmit an all-paths-busy tone from the source 230 to the calling line and to cause the release of the sender and trunk finder in the manner previously described.

*Timing circuit and trouble conditions*

The timing circuit of Fig. 9 comprises a driving motor 917 which drives a cam shaft through a friction clutch, the cam shaft being restored to normal by a spiral spring when the circuit of the driving motor is interrupted. The cam shaft is provided with timing cams 913 to 916, inclusive, and the timing circuit is provided with control relays 902 to 907, inclusive. The first timing period of ten seconds measured by the timing circuit starts upon the operation of off-normal relay 705 of the sender and the establishment of the previously traced circuit through the winding of start relay 905 whereupon relay 905 operates, locks under the control of relays 805 and 833 to ground and establishes the circuit through the timer motor 917. The operation of relay 805 from the identifier on the proper completion of the functions of the identifier, or the operation of relay 833 on a trouble release of the identifier will release relay 905 to arrest the operation of the timer and when the circuit of relay 905 is reclosed as by the operation of relay 834 the timer will again be started to measure a time interval.

When the timer closes its first set of contacts associated with cam 915, after an elapse of approximately ten seconds, relay 902 will operate if relay 645 has been operated on a sender seizure to check for a false ground on a party line as hereinbefore described. If, however, relay 645 has not been operated, then relay 902 is ineffective. If the timer advances to close its second set of contacts associated with cam 914, after the elapse of an additional ten seconds interval, relay 903 is operated to provide a supplemental operating ground for relay 905 over its upper No. 2 contacts from ground on off-normal ground conductor 710 and to establish a circuit for the trouble relay 743, which may be traced from battery through the winding of relay 743 over conductor 929, over the upper No 3 contacts of relay 905 and the upper No. 3 contacts of relay 903 to ground on conductor 710. With relay 743 operated and locked over its lower No. 1 contacts to ground on conductor 710, a circuit is established from battery through the winding of relay 805, over conductor 650, conductor 845 to ground over the lower No. 4 contacts of relay 743 thereby operating relay 805 which thereupon locks over its lower No. 3 contacts to ground on conductor 709 and a circuit is established for either relay 630 or 632 to cause the operation of a sender-trunk-connector. It will be assumed that the circuit of relay 630 is established over conductor 631, the upper No. 4 contacts of relay 743, conductor 734 and thence as previously traced.

With relay 805 operated, relay 905 of the timing circuit is released as soon as relay 903 releases after the timer has opened the contacts associated with its cam 914 and the timer is thereupon restored to normal. A circuit is now established for relay 906 which may be traced from battery through its winding over the upper back contact of relay 907, over conductor 930, the upper No. 3 back contact of relay 736, conductor 931, over back contacts of relays 904, 903, 902 and 905, conductor 932, the lower No. 2 front contact of relay 805, conductor 919, the normally closed contacts associated with timer cam 916, conductor 926, the lower front contact of relay 834, if relay 834 has been operated, or over the lower back contact of relay 833 and the lower No. 1 back contact of relay 800 to ground on conductor 830. Relay 906 upon operating locks over its operating circuit just traced to conductor 931 thence over its upper No. 2 front contact, conductor 933 and the upper No. 1 front contact of relay 805, thence to ground over conductor 926 as traced and closes the circuit of timer motor 917 over its upper No. 4 contacts. When the sender trunk connector has operated to connect the sender to the trunk, relay 736 operates whereupon relay 906 releases and the timer restores. With relay 736 operated a circuit is now established from battery through the winding of relay 907, over the upper No. 1 back contact of relay 906, conductor 934, the upper front contact of relay 736, conductor 931, thence as previously traced over the operating circuit of relay 906 to ground on conductor 830. Relay 907 upon operating locks over its upper No. 1 contact, conductor 933, the upper No. 1 front contact of relay 805, conductor 926 and thence to ground on conductor 830 and closes the circuit of timer motor 917 over its upper No. 3 contacts.

With relay 743 operated a circuit is established from ground over its lower No. 3 contacts and the lower back contact of relay 731 to conductor 1128 and thence as traced to battery through the winding of relay 214 of the trunk whereupon the all-paths-busy tone is transmitted to the calling line and the operated apparatus is dismissed in the manner previously described. If relay 809 has been operated from the failure of a second identifier to function properly and a time-out occurs to operate relay 743 as previously described, the alarm conductor 408 in the trunk becomes grounded over the No. 20 contacts of sender-trunk-connector relays 1100 and 1131F, over conductor 652, over the inner upper front contact of relay 809 and conductor 846 to ground over the lower No. 2 contacts of relay 743. Upon the grounding of conductor 408 in the trunk the alarm relay 409 is operated and locked and the trunk alarm together with the trouble indicator record made prior to the operation of relay 809 serves to identify the trunk or sender which caused the time-out.

Upon the operation of relay 214 of the trunk the dialing loop extending to the sender through the winding of relay 1000 will be opened thereby releasing relays 1000, 1015 and 1016 to initiate the release of the sender. A circuit is now established for relay 602 extending from battery through its winding over conductor 653, the upper No. 3 contacts of relay 703, conductor 654, the lower No. 2 back contact of relay 603, conductor 655 to ground at the lower back contact of relay 1016. If the sender has not been released in response to the release of relay 1000, another ten seconds period will be measured by the timing circuit and when cam 913 closes its contacts relay 904 will be operated. A circuit for release relay 704 of the sender is now effective from battery therethrough over the normal contacts of jack 747, the upper No. 2 contacts of trouble relay 743, brush 856 of switch 850 and the normal terminal of its arc, the lower No. 1 front contact of relay 736, conductor 748, the upper No. 4 contacts of relay 602, the lower No. 2 front contact of relay 603, conductor 655 to ground at the lower back contact of relay 1016. Relay 704 now operates to cause the restoration of the sender and associated apparatus.

*Partial dial*

The sender is seized as soon as a call comes in on the trunk circuit. It is therefore necessary to dial a digit into the trunk and a digit into the sender before the identifier can function to operate relay 805. The time-out interval previously discussed covers a failure of these digits to be dialed.

*Time-out from identifier release to sender-trunk-connector cut-through*

When relay 805 operates to initiate the release of the identifier it opens the circuit of relay 905 of the timing circuit which releases and causes the timer to return to normal. When all of the relays of the timing circuit release, a circuit is established for relay 906 extending from battery through its winding, over the upper back contact of relay 907, conductor 930, the upper No. 3 back contact of relay 736, conductor 931, over the lower back contact of relay 904, the upper back contact of relay 903, the upper back contact of relay 902, the upper back contact of relay 905, conductor 932, the lower No. 2 front contact of relay 805, conductor 919 over the normal contacts associated with cam 916 of the timer, conductor 926, the lower back contact of relay 833 and the lower No. 1 back contact of relay 800 to ground on conductor 830 and relay 906 operates locking under the control of relay 736 as previously described and starting the timer motor 917. If, for any reason, the sender cannot obtain a sender-trunk-connector and relay 736 does not operate, the timing will continue and after from 30 to 35 seconds the contacts controlled by cam 913 will close to cause the operation of relay 904. With relays 904 and 906 both operated, a visual alarm circuit is closed from battery through lamp 935, over the inner lower contacts of relay 906 and the upper No. 3 contacts of relay 904 to ground on conductor 710 and an audible alarm circuit is closed over the lower contacts of relay 904 to ground on conductor 710. The circuits will remain in this condition until a sender-trunk-connector has cut through to operate relay 736 and thereby release relay 906 or until all senders become busy. When all senders become busy, the common group circuit associated with the trunk finders connects ground over conductor 560, the upper No. 3 contacts of relay 906, the lower No. 1 front contacts of relay 904, conductor 936, over the upper No. 1 contacts of relay 603 to battery through the upper winding of relay 628. Relay 628 now operates and locks over its lower winding and lower No. 1 contacts to ground on off-normal ground conductor 706.

Relay 628 upon operating establishes a circuit from ground through resistance 656, over its lower No. 2 front contact, through both windings of relay 629, over the upper No. 1 front contact of relay 628, conductor 528, the upper No. 4 contacts of relay 520, brush 522, conductor 220, the lower No. 6 front contact of relay 210 and over conductor 250 to battery through the lower winding of no-ticketing relay 322. This is an operate condition for relay 629 and a non-operate condition for relay 322. Relay 629 thereupon operates and establishes a circuit from ground over its front contacts, over the upper No. 3 front contact of relay 628 to battery through the winding of relay 749 which operates, locks over its lower contacts to off-normal ground on conductor 706 and establishes a shunt from ground over its upper contacts and the lower No. 3 front contact of relay 628 and over the inner lower contacts of relay 604 to a point between the windings of relay 629 thereby shunting the upper winding thereof. Relay 322 in the trunk circuit now operates to establish the no-ticketing condition previously described and connects ground over the upper front contact of relay 300 and its own lower No. 3 contacts, thence over the circuit previously traced through the lower winding of relay 629, thence over the inner lower contacts of relay 604, over the lower No. 3 front contact of relay 628 to ground at the upper contacts of relay 749. Relay 629 now releases and closes a circuit from ground over its back contact, the upper No. 2 front contact of relay 628, over the inner upper front contact of relay 749 to battery through the winding of release relay 704 to initiate the release of the sender.

*Time-out from sender-trunk-connector cut-through to sender release*

This timing stage covers the interval in which the printing of the ticket takes place. It will also time dialing and out-pulsing when these functions have not been completed prior to the cut-through of the sender-trunk-connector. When relay 736 operates in response to the sender-trunk-connector cut-through, relay 906 of the timing circuit releases and the timer is returned to normal. With the timer in its normal position and all of the timing relays released, a circuit is established from battery through the winding of relay 907 over the upper No. 1 back contact of relay 906, conductor 934, the upper No. 3 front contact of relay 736, conductor 931, thence in series over back contacts of relays 904, 903, 902 and 905, conductor 932, the lower No. 2 front contact of relay 805, conductor 919, the contacts closed by cam 916 in the normal position of the timer, conductor 926 and thence as previously traced to ground. Relay 907 upon operating locks over its upper No. 1 contacts, conductor 933, the upper No. 1 contacts of relay 805 and thence as traced to ground and over its own upper No. 3 contacts establishes the circuit for motor 917. Timing continues and if the sender is not released in the normal manner the circuits function as hereinafter described.

If the trunk does not become advanced to the transmission condition and relay 731 has not become operated after ten seconds, relay 903 becomes operated by the closure of the contacts associated with cam 914 and the trouble relay 743 becomes operated over a circuit extending from battery through its winding, over conductor 751, the lower normal contacts of relay 649, the lower No. 1 back contact of relay 601, conductor 657, the upper No. 2 contacts of relay 907 and the inner lower front contacts of relay 903 to ground on conductor 710. Relay 743 operates, locks and connects ground over its lower No. 3 contacts, the lower No. 2 back contact of relay 731, conductor 1128, over the No. 17 contacts of relays 1131F and 1100 of the sender-trunk-connector, conductor 444, conductor 311 and to battery through the winding of relay 214 of the trunk. Relay 214 operates to send an all-paths-busy signal to the calling subscriber's line and opens the dialing loop toward the sender whereupon relays 1000, 1015 and 1016 release and relay 602 operates, as previously described. The sender functions as for an abandoned call and if the printing has not started and progress switch 850 has not been moved off-normal, a circuit is established for release relay 704 as soon as relay 603 operates which may be traced from battery through the winding of relay 704, over the normal contacts of jack 747, the upper No. 2 contacts of relay 743, the normal terminal of the arc associated with brush 856 of switch 850, over the lower No. 1 contacts of operated relay 736, conductor 748, the upper No. 4 contacts of relay 602, the lower No. 2 front contact of relay 603 and conductor 655 to ground at the lower back contact of relay 1016. The sender and associated circuits are then restored to normal in the regular manner.

If printing has started, the circuit functions as previously described except that the circuit does not release until after printing has progressed to cut the ticket for the previous call handled by the associated trunk which cutting function takes place when brush 853 of progress switch 850 is in engagement with the No. 8 terminal of its arc. After the progress switch advances from its No. 8 position after the completion of the ticket cutting function and brush 855 engages the No. 9 terminal of its arc, and until it passes beyond the No. 14 terminal of its arc, the circuit for release relay 704 is established from battery through its winding, over the normal contacts of jack 747, the upper No. 1 front contact of relay 743, strapped terminals of the arc of switch 850 engaged by brush 855, and thence as previously traced to ground at the lower back contact of relay 1016. If there is trouble in the printing circuit which prevents the progress switch 850 from advancing its brush 855 to the No. 9 terminal of its arc, the sender-trunk-connector and day and hour circuit if connected will be held out of service. Calls will in this case be prevented from being served by all trunks associated with the sender-trunk-connector by ground connected from conductor 710 over the upper No. 1 contact of relay 904, over the lower contact of relay 907, conductor 1133 and thence as traced to battery through the winding of group busy relay 1132 associated with the sender-trunk-connector then in use. With relays 904 and 907 both operated, the circuit to the audible alarm is closed over the lower front contact of relay 904 and a circuit for the alarm lamp 935 is established from battery therethrough over the inner lower front contact of relay 907, the upper front contact of relay 904, conductor 939, over the lower No. 4 front contact of relay 736 to intermittent ground supplied through the operation of interrupter cam 753. These alarms will function until attended by the maintenance man.

If the trunk has not advanced to the transmission stage but relay 731 is operated, relay 903 of the timing circuit operates and, as before described, causes the operation of trouble relay 743. With relay 731 operated, when relay 743 operates, a circuit is established from ground over its lower No. 3 contacts, the lower front contact of relay 731, conductor 752, the No. 2 contacts of relays 1131F and 1100 of the sender-trunk-connector, conductor 445 to battery through the winding of the cut-through relay 210 of the trunk. The operation of relay 210 in case the time-out was due to a failure of the trunk relays to operate, will permit conversation and when the conversation is completed the trunk will function to free the connected lines. The sender and sender-trunk-connector and all trunks of the sender-trunk-connector group will be held out of service. When timing relay 904 operates, ten seconds following the operation of relay 903, the sender audible and visual alarms will operate as previously described until attended by the maintenance man.

*Trunk advanced to the transmission condition*

If the sender times out after relay 601 has operated and before printing has started, the circuit previously traced for the trouble relay 743 will not be effective but instead of circuit will be established from battery through the winding of the no-ticketing relay 733 of the sender, over the upper No. 2 back contact of relay 743, the normal terminal and brush 856 of progress switch 850, over the lower No. 5 back contact of relay 743, conductor 754, the lower No. 1 contacts of relay 601, conductor 657, the upper No. 2 contacts of timing relay 907 and over the inner lower front contact of relay 903 to ground on conductor 710. Relay 733 upon operating locks to ground over its upper No. 1 contacts and opens the circuit of either relay 630 or 632, whichever has been operated, which then releases to release the sender-trunk-connector. After another ten seconds period, timing relay 904 will operate to cause the operation of the audible and visual alarms and the sender and associated trunk will be held out of service until restored by the maintenance man.

If the sender times out after relay 601 has operated and after printing is started but before printing is completed, the sender, trunk, sender-trunk-connector and month, day and hour circuit if connected will be held out of service and calls will be prevented from being served by all trunks associated with the sender-trunk-connector by ground connected to conductor 1133 over the lower contacts of relay 907 and the inner upper contacts of relay 904 thereby causing the operation of the group-busy relay 1132 of the sender-trunk-connector.

If the sender times out after printing is completed and the brushes 851, 853 and 855 of the progress switch 850 are in engagement with the No. 8 terminals of their arcs, the operation of relay 903 of the timing circuit will complete a circuit from ground on conductor 710 over the inner lower front contact of relay 903, the upper No. 2 contact of relay 907, conductor 657, the inner lower No. 1 front contact of relay 601, conductor 754, the lower No. 5 back contact of trouble relay 743, brush 855 and the No. 18 terminal of its arc over the upper No. 2 back contact of relay 743 to battery through the winding of the no-ticketing relay 733. Relay 733 upon operating releases the sender-trunk-connector. After another ten seconds period timing relay 904 will operate to cause the operation of the audible and visual alarms and the sender and associated trunk will be held out of service until restored by the maintenance man.

Whenever the visual alarm lamp 935 associated with the sender timing circuit of Fig. 9 flashes, as previously described, under the control of interrupter 753, it is a signal that the sender is in a stuck condition.

To hold the sender out of service when it times out and to prevent the operation of its release relay 704, a plug may be inserted into jack 747 thereby opening the operating circuit of relay 704. On a normal call this jack serves no useful purpose. A release jack 755 is also provided for each sender whereby the sender may be restored to normal by the insertion of a plug into such jack thereby completing the circuit of the sender-release relay 704. The withdrawal of the plug permits the sender to restore to normal.

What is claimed is:

1. In a telephone system, a two-party subscriber's line, a trunk, switching means for establishing a connection from said line over said trunk to a called line, a sender associable with said trunk, a party test relay in said sender, means for preparing said relay for operation, means operable following the registration of a first digit dialed into said sender from said calling line for connecting said relay to said line for a predetermined interval whereby said relay is operated if the tip party on said line initiated the call, means operative if said relay is operated at the end of said interval for registering the fact that the tip party on said line initiated the call and means operative if said relay is not operated at the end of said interval for registering the fact that the ring party on said line initiated the call.

2. In a telephone system, a two-party subscriber's line, a trunk, switching means for establishing a connection from said line over said trunk to a called line, a sender associable with said trunk, a double-wound party test relay in said sender, means for establishing a biasing circuit through one winding thereof upon the seizure of said sender to prepare said relay for operation, a train of relays including a slow-to-release relay operable upon the seizure of said sender, means operable following the registration of the first digit dialed into said sender for releasing certain of said train of relays, including said slow-to-release relay, means controlled by said train of relays and until said slow-to-release relay is released for connecting the second winding of said test relay to said calling line whereby said test relay is operated if the tip party on said line initiated the call, means operative if said test relay is operated upon the release of said slow-to-release relay for registering the fact that the tip party on said line initiated the call and means operative if said test relay is not operated upon the release of said slow-to-release relay for registering the fact that the ring party on said line initiated the call.

3. In a telephone system, a two-party subscriber's line, a trunk, switching means for establishing a connection from said line over said trunk to a called line, a plurality of senders, means for associating said trunk when seized with an idle sender, a party test relay in said sender, means operative following the seizure of said sender for connecting said relay to said line for a predetermined interval whereby said relay is operated if the tip party on said line initiated the call, a relay in said trunk operative in response to the operation of said test relay, means operative following the completion of the establishment of the connection by said sender for disassociating said sender from said trunk, means effective upon the initiation of the release of the established connection by said calling subscriber if said trunk relay is operated for again associating said trunk with the same or another idle sender and for informing such sender that it is a second sender seizure by said trunk and means for connecting the party test relay of such sender with said calling line to test for an unstandard ground condition on said line.

4. In a telephone system, a two-party subscriber's line, means at the tip station thereof for connecting ground to the talking conductors of said lines when calling, a trunk, switching means for establishing a connection from said line over said trunk to a called line, a plurality of senders, means for associating said trunk when seized with an idle one of said senders, a party test relay in said sender, means operative following the seizure of said sender for connecting said relay to the talking conductors of said line for a predetermined interval whereby said relay is operated under the control of the substation ground if the tip party initiated the call, a relay in said trunk operative in response to the operation of said test relay, means operative following the completion of the establishment of the connection by said sender for disassociating said sender from said trunk, means effective upon the restoration of the calling substation receiver to its switchhook, if a tip party substation, for removing said substation ground and for initiating the release of the connection, means thereupon effective if said trunk relay has been operated for again associating said trunk with the same or another idle sender and for informing such sender that it is a second sender seizure by said trunk and means for connecting the party test relay of such sender with said calling line to ascertain if there is an unstandard ground condition on said line.

5. In an automatic ticketing system, a two-party subscriber's line, a trunk having a toll ticket printer, switching means for establishing a connection from said line over said trunk to a called line, a plurality of senders, means for associating a trunk when seized with an idle one of said senders, a party test relay in said sender, means for connecting said relay to said line to determine which of the two party line subscribers has initiated the call, a relay in said trunk operative in response to the operation of said test relay if a tip party substation is found to have initiated the call, means operative following the completion of the establishment of the connection by said sender for disassociating the sender from said trunk, means effective upon the initiation of the release of the connection by the calling subscriber for again associating said trunk with the same or another idle sender and for informing such sender that it is a second sender seizure by said trunk, means for connecting the party test relay of such sender with said calling line and means operative if said party test relay then operates to control said printer to print characters on the toll ticket indicative of the existence of an unstandard ground condition on the calling line.

6. In an automatic ticketing system, a two-party subscriber's line, a trunk having a toll ticket printer, switching means for establishing a connection from said line over said trunk to a called line, a plurality of senders, means for associating a trunk when seized with an idle sender, means in said sender for registering data relating to said connection, a progress switch for progressively associating the registering means with said printer for controlling said printer to print characters on a toll ticket in accordance with said registered data, a party test relay in said sender for determining if said connection was initiated from a tip or a ring party substation, a relay in said trunk operable if the connection is found to be initiated from a tip party substation, means controlled by said trunk relay following the initiation of the release of the connection by the calling subscriber for again associating said trunk with the same or another idle sender, means for connecting the test relay of such sender to said calling line to test for an unstandard ground condition on said line, and means effective if an unstandard ground condition is found for rendering the progress switch of such sender effective to control said printer to print characters on the toll ticket indicative of the existence of the unstandard ground condition.

7. In an automatic ticketing system, a two-party subscriber's line, a trunk having a toll ticket printer, switching means for establishing a connection from said line over said trunk to a called line, a plurality of senders, means for associating a trunk when seized with an idle sender, means in said sender for registering data relating to a connection, a progress switch for progressively associating said registering means with said printer for controlling said printer to print characters on a toll ticket in accordance with said registered data, a party test relay in said sender for determining if said connection was initiated from a tip or a ring party substation, a relay in said trunk operable if the connection is found to be initiated from a tip party substation, means controlled by said trunk relay following the initiation of the release of the connection by the calling subscriber for again associating said trunk with the same or another idle sender, means for connecting the party test relay of such sender to said calling line to test for an unstandard ground condition on said line, and a transfer relay in such sender operable by said party test relay if an unstandard ground condition is found for controlling the progress switch of said sender to omit the progressive association of said printer with certain of the registering means and to progressively associate other of the registering means with said printer to control said printer to print characters on the toll ticket indicative of the existence of the unstandard ground condition.

8. In an automatic ticketing system, a two-party subscriber's line, a trunk having a toll ticket printer, switching means for establishing a connection from said calling line over said trunk to a called line, a plurality of senders, means for associating a trunk when seized with an idle sender, means in said sender for registering data relating to a connection including the calling and called line numbers and the number of the sender used, a progress switch for progressively associating said registering means with said printer for controlling said printer to print characters on a toll ticket in accordance with said registered data, a party test relay in said sender for determining if the connection was originated from a tip or a ring party substation, a relay in said trunk operable if the connection is found to be initiated from a tip party substation, means controlled by said trunk relay following the initiation of the release of the connection by the calling subscriber for again associating said trunk with the same or another idle sender, means for connecting the party test relay of such sender to said calling line to test for an unstandard ground condition on said line, and a transfer relay in such sender operable by said party test relay if an unstandard ground condition is found for controlling the progress switch of said sender to omit the progressive association of the registering means which register the digits of the calling line number and to progressively associate other of said registering means which register the sender number with said printer to control said printer to print additional characters on the toll ticket including the digits of the sender number as an indication of the existence of the unstandard ground condition and that the toll ticket should therefore be discarded.

9. In an automatic ticketing system, a calling line, a trunk, switching means for establishing a connection from said calling line over said trunk to a called line, a plurality of senders, means for associating a trunk when seized with an idle sender, means for identifying the calling line associable with said sender, a monitoring operator's position, and means operative in the event that the identifier fails to identify the calling line to connect said line with said operator's position whereby said operator may ascertain the number of such line for toll ticketing purposes.

10. In an automatic ticketing system, a calling line, a trunk, switching means for establishing a connection from said calling line over said trunk to a called line, a plurality of senders, means for associating a trunk when seized with an idle sender, a plurality of calling line identifiers, means for associating an idle one thereof with the sender seized by a trunk to make an identification of the calling line, means effective if said identifier fails to identify said line to disconnect it from said sender and to connect another identifier with said sender, a monitoring operator's position, and means operative in the event that said second identifier fails to identify the calling line to connect said line to said operator's position whereby said operator may ascertain the number of such line for toll ticketing purposes.

11. In an automatic ticketing system, a calling line, a trunk, switching means for establishing a connection from said calling line over said trunk to a called line, a plurality of senders, means for associating a trunk when seized with an idle sender, a plurality of calling line identifiers, means for associating an idle one thereof with the sender seized by the trunk to make an identification of the calling line, means effective if said identifier fails to identify said line to disconnect it from said sender and to connect another identifier with said sender, a monitoring operator's position common to all of said senders, means operative in the event said second identifier fails to identify the calling line to connect said sender with said operator's position, and means operative upon the response of said operator for establishing a connection from her position through said sender to said calling line whereby she may ascertain from the calling subscriber the number of his line for toll ticketing purposes.

12. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection including the digits of the calling line number, a progress switch in said sender for progressively associating the registering means of the sender with said printer for controlling said printer to print characters on the toll ticket in accordance with the registered data, means for identifying the calling line and for controlling the registration of the digits of the calling line number in said sender, a monitoring operator's position common to all of said senders, means operative in the event said identifier fails to identify the calling line to connect said sender with said operator's position, means operative upon the response of said operator for extending a connection from her position through said sender to said calling line whereby she may ascertain from the calling subscriber the number of his line, and means operative following the disconnection by said operator for controlling said progress switch whereby said printer is caused to print zeros on the toll ticket in lieu of the calling line number normally printed under the control of the calling line number registering means.

13. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection including the digits of the calling line number, a progress switch in said sender for progressively associating the registering means of the sender with said printer for controlling said printer to print characters on a toll ticket in accordance with the registered data, a plurality of calling line identifiers, means for associating an idle one thereof with the seized sender to make an identification of the calling line and for controlling the registration of the digits of the calling line number in said sender, means effective if said identifier fails to identify said line to disconnect it from said sender and to connect another identifier with said sender, a monitoring operator's position common to all of said senders, means operative in the event said second identifier fails to identify the calling line to connect said sender with said operator's position, means operative upon the response of the operator for extending a connection from her position through said sender to said calling line whereby she may ascertain from the calling subscriber the number of his line, and means operative following disconnection by said operator for controlling said progress switch whereby said printer is caused to print zeros on the toll ticket in lieu of the digits of the calling line number normally printed under the control of the calling line number registering means.

14. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection including the digits of the calling line number, a progress switch in said sender for progressively associating the registering means of the sender with said printer for controlling the printer to print characters on a toll ticket in accordance with the registered data, means for identifying the calling line and for controlling the registration of the digits of the calling line number in said sender, a monitoring operator's position common to all of said senders, means operative in the event said identifier fails to identify the calling line to initiate the connection of said operator's position with said calling line, and means operative if said operator's position has been associated with another calling line through another sender to control said progress switch whereby said printer is caused to print zeros on the toll ticket in lieu of the digits of the calling line number normally printed under the control of the calling line registering means.

15. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection including the digits of the calling line number, means for controlling said printer in accordance with said registered data, means for identifying the calling line and for controlling the registration of the digits of the calling line number in said sender, means for thereupon releasing said identifier, a timing circuit, means in said trunk operative in response to said timing circuit if said identifier is not released within a predetermined interval to transmit an all-paths-busy tone to said calling line, and to initiate the release of said sender and identifier, and means operative in response to said timing circuit if said sender is not released within a further predetermined interval to cause the release of said sender.

16. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection, means for establishing control circuits from said sender to said printer over which said printer is controlled in accordance with said registered data, a timing circuit and means operated thereby if said control circuits are not established within a predetermined interval to cause said trunk to cancel the operation of said printer whereby said connection is handled on a non-ticketed basis.

17. In an automatic ticketing system, a calling line, a trunk having a toll ticket printer, switching means for establishing a connection from said calling line over said trunk to a called line, a plurality of senders, means for associating a trunk when seized with an idle sender, means in said sender for registering data relating to the established connection, means for establishing control circuits from said sender to said printer over which said printer is controlled in accordance with said registered data, a timing circuit, alarm devices, and means operated by said timing circuit if the control of said printer is not completed within a predetermined interval to operate said alarm devices and to hold said sender and trunk out of service until restored by a maintenance man.

18. In an automatic ticketing system, a calling line, a trunk, switching means for establishing a connection from said calling line over said trunk to a called line, a plurality of senders, means for associating a trunk when seized with an idle sender, and a timing circuit for timing operations of said sender comprising a plurality of start relays operable respectively at different stages in the operation of said sender, a motor-driven cam shaft operable in response to the operation of any one of said start relays, contacts closable by the cams on said cam shaft at the expiration of different time intervals and timing relays controlled by said contacts for controlling functions of said sender at the ends of predetermined time intervals initiated by the operation of different ones of said start relays.

FOSTER B. BLAKE.

REFERENCES CITED

The following references are of record in the file of this patent:

UNITED STATES PATENTS

| Number | Name | Date |
|---|---|---|
| 1,809,039 | Howland | June 9, 1931 |
| 1,860,459 | Edwards | May 31, 1932 |
| 2,306,173 | Logan | Dec. 22, 1942 |
| 1,563,599 | Walters | Dec. 1, 1925 |
| 2,352,492 | Catline | June 27, 1944 |
| 2,224,696 | Raymond | Dec. 10, 1940 |
| 2,297,365 | Ostline | Sept. 29, 1942 |
| 2,291,496 | Newstedt | July 28, 1942 |
| 1,896,757 | Strickler | Feb. 7, 1933 |
| 1,897,048 | Holton | Feb. 14, 1933 |
| 1,859,924 | Johnson et al. | May 24, 1932 |
| 2,143,971 | Brazelton | Jan. 17, 1939 |
| 1,594,003 | Carpenter | July 27, 1926 |
| 1,563,599 | Walters | Dec. 1, 1925 |